US008621745B2

(12) United States Patent
Deonarine et al.

(10) Patent No.: US 8,621,745 B2
(45) Date of Patent: Jan. 7, 2014

(54) STRETCH FILM SLEEVE LABEL APPLICATOR

(75) Inventors: Indarjit Deonarine, Schaumburg, IL (US); Gerard B. Doyle, Liverpool (GB); Alfred Werzi, Ruden (AT)

(73) Assignee: CCL Label GmbH, Hohenems (AT)

( * ) Notice: Subject to any disclaimer, the term of this patent is extended or adjusted under 35 U.S.C. 154(b) by 948 days.

(21) Appl. No.: 12/519,123

(22) PCT Filed: Dec. 12, 2007

(86) PCT No.: PCT/US2007/087109
§ 371 (c)(1), (2), (4) Date: Mar. 22, 2010

(87) PCT Pub. No.: WO2008/076718
PCT Pub. Date: Jun. 26, 2008

(65) Prior Publication Data
US 2010/0163164 A1 Jul. 1, 2010

Related U.S. Application Data
(60) Provisional application No. 60/870,245, filed on Dec. 15, 2006.

(51) Int. Cl.
*B23P 21/00* (2006.01)

(52) U.S. Cl.
USPC .................. 29/775; 29/771; 29/782; 29/794; 29/521; 29/793; 53/556; 53/585; 700/63; 700/122

(58) Field of Classification Search
USPC .......... 29/775, 771, 773, 782, 791, 793, 794, 29/796, 448, 505, 521, 790; 53/399, 441, 53/556, 585; 700/122, 63
See application file for complete search history.

(56) References Cited

U.S. PATENT DOCUMENTS 1,325,173 A * 12/1919 Shirlow .......................... 82/48
2,815,628 A * 12/1957 Erickson et al. ............... 53/291
3,682,026 A * 8/1972 Criss et al. ...................... 82/75
4,012,972 A * 3/1977 Rice .............................. 82/70.2
(Continued)

FOREIGN PATENT DOCUMENTS

JP 06259015 9/1994
JP 2002160709 A 6/2002

OTHER PUBLICATIONS

International Search Report dated Apr. 16, 2008 for PCT/US2007/087109 (WO 08/076718).

*Primary Examiner* — Jermie E Cozart
*Assistant Examiner* — Bayan Salone
(74) *Attorney, Agent, or Firm* — Levenfeld Pearlstein, LLC

(57) ABSTRACT

A stretch film sleeve label applicator for separating a stretchable sleeve label from a web of such labels and applying the label to an item, such as a container, is disclosed. The applicator is particularly useful for applying high stretch labels to highly contoured containers. The applicator is configured to receive a series of labels in an elongated, continuous web of flat, 2-ply sleeve labels, open the continuous sleeve of labels, separate an individual label from a next successive label, stretch the label to permit its application to an item to be labeled, such as a container, and apply the label in an accurate and precise location on the container. The applicator comprises three primary components: a label feeding assembly, a label separating assembly and a label stretching assembly. Various embodiments of the label feeding assembly, label separating assembly and label stretching assembly are disclosed.

12 Claims, 35 Drawing Sheets

(56) References Cited

U.S. PATENT DOCUMENTS

| | | | | |
|---|---|---|---|---|
| 4,102,728 | A * | 7/1978 | Smith | 156/362 |
| 4,201,029 | A * | 5/1980 | Lerner et al. | 53/429 |
| 4,202,153 | A * | 5/1980 | Lerner et al. | 53/459 |
| 4,286,421 | A * | 9/1981 | Fujio | 53/399 |
| 4,387,553 | A * | 6/1983 | Strub et al. | 53/585 |
| 4,412,876 | A * | 11/1983 | Lerner et al. | 156/64 |
| 4,467,207 | A | 8/1984 | Lerner et al. | |
| 4,514,966 | A * | 5/1985 | Konstantin | 53/585 |
| 4,519,186 | A * | 5/1985 | Winter et al. | 53/585 |
| 4,556,443 | A * | 12/1985 | Moya | 156/356 |
| 4,620,888 | A | 11/1986 | Easter et al. | |
| 4,651,506 | A | 3/1987 | Lerner et al. | |
| 4,680,205 | A | 7/1987 | Lerner et al. | |
| 4,731,976 | A * | 3/1988 | Nye | 53/399 |
| 4,765,121 | A * | 8/1988 | Konstantin et al. | 53/442 |
| RE32,963 | E | 6/1989 | Lerner et al. | |
| 4,910,941 | A * | 3/1990 | Nagano et al. | 53/291 |
| 4,922,683 | A * | 5/1990 | Connolly | 53/296 |
| 4,926,048 | A | 5/1990 | Lerner et al. | |
| 4,945,252 | A | 7/1990 | Lerner et al. | |
| 4,969,310 | A | 11/1990 | Lerner et al. | |
| 5,024,049 | A * | 6/1991 | Strub et al. | 53/585 |
| 5,123,300 | A * | 6/1992 | Himmelein et al. | 74/640 |
| 5,134,833 | A | 8/1992 | Lerner et al. | |
| 5,179,819 | A | 1/1993 | Sukeyasu et al. | |
| 5,317,794 | A | 6/1994 | Lerner et al. | |
| 5,380,381 | A * | 1/1995 | Otruba | 156/64 |
| 5,399,216 | A * | 3/1995 | Galchefski et al. | 156/215 |
| 5,403,416 | A * | 4/1995 | Bright et al. | 156/86 |
| 5,417,794 | A * | 5/1995 | Menayan | 156/362 |
| 5,433,057 | A * | 7/1995 | Lerner et al. | 53/399 |
| 5,442,851 | A | 8/1995 | Lerner et al. | |
| 5,477,956 | A | 12/1995 | Liebhart | |
| 5,483,783 | A * | 1/1996 | Lerner et al. | 53/399 |
| 5,566,527 | A * | 10/1996 | Drewitz | 53/295 |
| 5,588,278 | A * | 12/1996 | Wynn et al. | 53/399 |
| 5,597,433 | A * | 1/1997 | Dyble et al. | 156/203 |
| 5,715,651 | A * | 2/1998 | Thebault | 53/399 |
| 5,722,218 | A | 3/1998 | Lerner | |
| 5,743,070 | A | 4/1998 | Lerner et al. | |
| 5,806,276 | A | 9/1998 | Lerner et al. | |
| 5,820,714 | A * | 10/1998 | Lerner | 156/64 |
| 5,858,143 | A * | 1/1999 | Bright et al. | 156/86 |
| 5,887,412 | A | 3/1999 | Lerner et al. | |
| 5,944,424 | A | 8/1999 | Lerner et al. | |
| 5,987,856 | A | 11/1999 | Lerner | |
| 5,996,319 | A | 12/1999 | Lerner et al. | |
| 6,035,611 | A * | 3/2000 | Lerner | 53/455 |
| 6,055,796 | A | 5/2000 | Lerner et al. | |
| 6,170,238 | B1 | 1/2001 | Lerner | |
| 6,195,518 | B1 * | 2/2001 | Bennett et al. | 399/165 |
| 6,263,940 | B1 * | 7/2001 | Menayan | 156/556 |
| 6,287,671 | B1 * | 9/2001 | Bright et al. | 428/195.1 |
| 6,375,771 | B1 * | 4/2002 | Bright | 156/86 |
| 6,450,230 | B1 * | 9/2002 | Otruba | 156/566 |
| 6,474,390 | B1 * | 11/2002 | Vandevoorde | 156/494 |
| 6,488,794 | B1 * | 12/2002 | Bright et al. | 156/86 |
| 6,543,514 | B2 * | 4/2003 | Menayan | 156/540 |
| 6,550,226 | B1 * | 4/2003 | Gates et al. | 53/459 |
| 6,684,599 | B1 * | 2/2004 | Fresnel | 53/64 |
| 6,708,470 | B2 * | 3/2004 | Eiban et al. | 53/585 |
| 6,742,321 | B2 * | 6/2004 | Gates | 53/570 |
| 6,755,012 | B2 * | 6/2004 | Frankefort | 53/557 |
| 6,811,019 | B2 * | 11/2004 | Christian et al. | 198/471.1 |
| 6,889,739 | B2 * | 5/2005 | Lerner et al. | 156/498 |
| 6,955,846 | B2 * | 10/2005 | Lerner | 428/166 |
| 6,966,164 | B2 * | 11/2005 | Navarro et al. | 53/399 |
| 7,040,078 | B2 * | 5/2006 | Vandevoorde et al. | 53/556 |
| 7,062,894 | B2 * | 6/2006 | Loffler | 53/585 |
| 7,065,938 | B2 * | 6/2006 | Deckert | 53/441 |
| 7,125,463 | B2 * | 10/2006 | Lerner et al. | 156/145 |
| 7,231,748 | B2 * | 6/2007 | Liao | 53/389.1 |
| 7,257,934 | B2 * | 8/2007 | Swift et al. | 53/399 |
| 7,258,656 | B2 | 8/2007 | Lerner et al. | |
| 7,328,784 | B2 * | 2/2008 | Schinelli et al. | 198/459.2 |
| 7,603,188 | B2 * | 10/2009 | Maeda | 700/63 |
| 7,661,250 | B2 * | 2/2010 | Vandevoorde et al. | 53/585 |
| 7,718,028 | B2 * | 5/2010 | Lerner et al. | 156/252 |
| 7,767,288 | B2 * | 8/2010 | Lerner | 428/166 |
| 7,814,647 | B2 * | 10/2010 | Hollis et al. | 29/775 |
| 7,836,670 | B2 * | 11/2010 | Cerf | 53/588 |
| 7,918,005 | B2 * | 4/2011 | Hollis et al. | 29/430 |
| 7,918,016 | B2 * | 4/2011 | Hollis et al. | 29/775 |
| 8,099,932 | B2 * | 1/2012 | Peacop et al. | 53/441 |
| 8,146,333 | B2 * | 4/2012 | Fresnel | 53/585 |
| 8,146,334 | B2 * | 4/2012 | Fresnel | 53/585 |
| 2002/0017083 | A1 * | 2/2002 | Frankefort | 53/585 |
| 2003/0145702 | A1 * | 8/2003 | Eiban | 83/54 |
| 2004/0238065 | A1 * | 12/2004 | Loffler | 141/145 |
| 2004/0261363 | A1 * | 12/2004 | Deckert | 53/415 |
| 2010/0059163 | A1 * | 3/2010 | Till | 156/60 |

* cited by examiner

STRETCH FILM SLEEVE LABEL APPLICATOR

CROSS-REFERENCE TO RELATED APPLICATIONS

This is a National Stage Application of International Patent Application No. PCT/US2007/087109 with an international filing date of Dec. 12, 2007, which is based on and claims priority to U.S. patent application Ser. No. 60/870,245, filed on Dec. 15, 2006.

BACKGROUND OF THE INVENTION

The present invention relates to a device for applying a stretchable material to an item. More particularly, the present invention concerns a stretch film label applicator configured to separate a stretchable film sleeve label from a web of labels and apply it to a container, such as a bottle. The applicator of the present invention is particularly suitable for application of high stretch films used to apply labels to highly contoured containers.

The prior art has developed numerous methods to label product containers, such as bottles. For example, the earliest and simplest such methods involved printing information directly onto the container. Later methods included printing the information on a label which then was adhered to the container. However, it more recently has become commonplace to label bottles with stretchable sleeves without the use of adhesives. In particular, such sleeves often are used for beverage bottles and the like.

Advances in product container materials, design and manufacturing techniques over the years have led to the development of complex container designs, such as highly contoured bottles. However, traditional prior art stretch films may be unsuitable for application to such complex designs because such minimally stretch films, which exhibit about 0 to 10% stretch, may not offer sufficient elasticity to permit the film to closely follow the profile of the container. Thus, high stretch films, exhibiting about 0-40% stretch, recently have been developed for use on highly contoured containers.

Devices and methods for automatically placing stretch sleeves on containers are well known in the prior art. For example, U.S. Pat. No. 5,566,527 to Drewitz discloses an apparatus for applying a heat-shrinkable band to the neck or body of a container. The apparatus comprises a feeding assembly for advancing a continuous sleeve of heat-shrinkable polymeric material along a predetermined path in order to slip the sleeve over the cap or body of the container, and a cutting assembly to cut the sleeve. The cutting assembly uses a rotatable, extendable blade to slit the sleeve circumferentially after it is mounted on the container.

While this device may be appropriate for heat-shrinkable materials, it is not appropriate for stretch film label applications since there is no stretching mechanism and since the cutting assembly is designed to cut heat-shrinkable sleeves. The device is not optimized for cutting high stretch film sleeve materials, which exhibit significantly greater elasticity as compared to traditional, minimally stretch films.

In another such device, disclosed in U.S. Pat. Nos. 5,483,783 and 5,433,057 to Lerner et al., a high speed sleever uses a vacuum to secure a sleeve as the sleeve is being cut from a continuous sleeve roll or web. The sleever then uses pins to stretch the sleeve for positioning around a container. The pins use an outflow of gas to lubricate the space between the sleeve and the outside of the container as the sleeve and container are engaged with one another. The device also uses mechanical sleeve positioning grippers to frictionally hold the sleeve against the pins during application to the container. Individual sleeves are separated from a web at perforations or frangible regions as the sleeves are pulled from the web. However, this device is not particularly useful for the application of high stretch film sleeve materials to complex container designs, and the mechanical grippers rely solely on frictional engagement with the sleeve and, therefore, may not offer consistent sleeve placement on the container.

Additional devices are taught by U.S. Pat. Nos. 6,543,514 and 6,263,940 to Menayan. These devices also use pins to stretch a sleeve. However, the pins are solid, and, accordingly, no vacuum or air is used to facilitate sleeve engagement with or disengagement from the pins. Furthermore, in this device the container remains stationary while the stretched sleeve is moved over the container, rather than moving the container into the stretched sleeve. Again, such devices are not designed to apply high stretch film sleeve materials to highly contoured containers, and do not contain sufficient means to provide consistent sleeve placement on the containers.

U.S. Pat. No. 5,715,651 to Thebault utilizes two semi-circular collar sections on which the sleeves are positioned, rather than a set of pins, for stretching the sleeve. The collar sections include suction surfaces for engaging the outer surface of the sleeve while it is being stretched. However, such suction surfaces may be insufficient for adequately stretching high stretch film sleeve materials about a complex container design.

While some of the prior art devices discussed above may perform adequately to apply traditional minimally stretch films (about 0 to 10% stretch) to containers having relatively simple geometric designs, such devices are not well suited for application of high stretch films (about 0-40% stretch) to modem containers having complex geometric designs and significant contours.

Accordingly, there exists a need for a stretch film label applicator configured to apply a stretchable film sleeve label to a container, such as a bottle. Desirably, the applicator is suitable for application of high stretch sleeve film labels to highly contoured containers. More desirably, the applicator is configured to apply such labels in a reliable, consistent manner and to ensure proper positioning of the label on the container. More desirably yet, the applicator is adaptable to easily integrate within a container filling and packaging line. Most desirably, the applicator is configurable to apply both continuous sleeve labels as well as perforated labels.

BRIEF SUMMARY OF THE INVENTION

The present invention comprises a stretch film sleeve label applicator for separating a stretchable sleeve label from a web of such labels and applying the label to an item, such as a container.

Generally, the applicator is configured to receive a series of labels in an elongated, continuous web of flat, 2-ply sleeve labels, open the continuous sleeve of labels, separate an individual label from a next successive label, stretch the label to permit its application to an item to be labeled, such as a container, and apply the label in an accurate and precise location on the container. The process is repeated, preferably at a high rate of speed, on the order of many hundred containers per minute, to apply labels to numerous containers as part of a container filling, labeling and packing process. Such processes are quite common in the beverage industry, for example.

Three primary preferred embodiments are disclosed. In each preferred embodiment, the applicator comprises three primary components: a label feeding assembly, a label separating assembly and a label stretching assembly. The label feeding assembly, the label separating assembly and the label stretching assembly preferably are interactively coupled to one another such that a continuous sleeve of labels may be fed into the applicator by the label feeding assembly, individual labels separated from the web of labels by the label separating assembly and the labels applied to containers by the label stretching assembly.

The applicator is adaptable to easily integrate within any number of container filling, labeling and packaging lines as are known in the prior art, such those utilizing various conveyors (such as flat belt and carousel conveyors), screw shafts, elevators and the like to transport containers to and from the applicator.

The label feeding assembly is disposed at the uppermost portion of the applicator and comprises a mandrel mounted in a vertical orientation within a frame of the applicator. The mandrel is mounted to the applicator frame using a gimbal-style mounting system of opposed bearings. The gimbal-style mounting system allows the mandrel to move, or pivot, to a slight degree along axes in the horizontal plane (relative to the longitudinal axis of the mandrel) to accommodate for movements of the applicator and/or the sleeve during use and to maintain the sleeve in a substantially linear and vertical orientation.

The mandrel extends downwardly through the label feeding assembly and the label separating assembly and defines a guide path along which the sleeve travels through the applicator. To that end, the label feeding assembly further comprises at least one pair of opposed feed wheels disposed on opposite sides of the mandrel. The feed wheels frictionally engage the sleeve and direct it downwardly along the mandrel.

In one embodiment of the present invention, particularly useful for elongated sleeves of perforated stretch film labels, the feed wheels may be substituted by, or supplemented with, a feed belt system configured to frictionally engage the sleeve over an extended area without causing premature separation of the labels from one another at the perforations.

The label separating assembly is configured to separate individual labels from the continuous web of stretch film labels and to deliver the separated labels to the label stretching assembly for application to the container. In some embodiments of the applicator of the present invention, configured to be used for continuous webs of non-perforated stretch film labels, the label separating assembly separates individual labels using a circumferential cutter wheel having a plurality of cutting blades that rotates about the mandrel.

In one embodiment, a plurality of cutting blades that are slidably mounted to the cutter wheel. The cutting blades are configured to slide inwardly (toward the mandrel) and outwardly (away from the mandrel), between a cutting position and a non-cutting position, respectively, as the cutter wheel rotates about the mandrel. In this embodiment, the slidable movement of the cutting blades is controlled by a cam mechanism configured to extend the cutting blades into the cutting position when the sleeve is in the correct position on the mandrel.

In another embodiment, the plurality of cutting blades are pivotally mounted to a cutter wheel. The cutting blades are configured to pivot inwardly (toward the mandrel) and outwardly (away from the mandrel), between a cutting position and a non-cutting position, respectively, as the cutter wheel rotates about the mandrel. In this embodiment, the pivoting of the cutting blades preferably is controlled by a differential mechanism operatively connected to the cutter wheel and an engagement wheel.

In the embodiments of the label separating assembly that use a cutter wheel, the label separating assembly preferably further comprises a set of opposing grippers disposed on opposite sides of the mandrel beneath the cutter wheel to keep the sleeve stationary while it is being cut by the cutter wheel. The grippers are configured to frictionally engage the sleeve against the mandrel during the period that the blades are cutting the sleeve and to disengage from the sleeve when the cutting operation has completed.

In yet another embodiment of the label separating assembly of the present invention, configured to be used for webs of perforated stretch film labels, a label breaking mechanism is used instead of a cutter wheel. The label breaking mechanism comprises a pair of opposing breakers disposed on opposite sides of a vertically displaceable axial portion of the mandrel. The breakers are configured to momentarily frictionally engage the sleeve against the vertically displaceable axial portion of the mandrel and to exert a downward force against the sleeve, thus separating an individual label from the web at the perforation.

To prevent the sleeve from bunching or gathering along the mandrel during the label separation process, the vertically displaceable axial portion of the mandrel moves in a downward direction in speed with the sleeve while the breakers engage the sleeve. The vertically displaceable axial portion of the mandrel is spring-biased toward the upper end of the mandrel such that it returns to its starting position once the breakers disengage.

To transport the separated labels to the label stretching assembly, the label separating assembly preferably further comprises a set of opposed intermittent drive wheels disposed on opposite sides of the mandrel beneath the cutter wheel or the label breaking mechanism.

The intermittent drive wheels are each configured with a flat portion along their respective peripheries. The flat portion of the intermittent drive wheels does not frictionally engage the label, thus preventing any downward force from being exerted upon the label while the flat portion is in a generally parallel relationship with the mandrel. Accordingly, the flat portion "skips over" the label so the label remains stationary for that period of time.

The timing of the intermittent drive wheels is such that the intermittent drive wheels are disengaged from the label while the label is being separated from the web. This permits the label to remain stationary during separation, resulting in a clean separation of the label from the web, and permits the label stretching assembly to prepare to receive the label.

In still another embodiment of the label separating assembly of the present invention, again particularly useful for elongated sleeves of perforated stretch film labels, two feed belt systems are used (upper and lower). The feed belt systems are servo-controlled such that their speed may be variable and independently adjusted. In this manner, as the web is fed along the mandrel, both feed belt systems travel at the same speed. When a label is ready to be separated from the web and fed to the label stretching assembly, the second (lower) feed belt system is momentarily accelerated, thereby tearing the label from the web. Thus, the lower feed belt system replaces the intermittent drive wheels.

In the preferred embodiment, the label stretching assembly comprises a plurality of upstanding fingers that are generally parallel to one another and equally spaced from one another relative to a longitudinal axis of the assembly. The fingers move toward and away from each other to receive a separated label and to stretch and apply the label to a container. In the preferred embodiment, the fingers move toward and away from one another (into a contracted position and an expanded position) by engagement with a cam plate that is located below the fingers.

Each finger further includes an integrated channel that permits the application of air pressure and vacuum to an outer surface of the fingers through an opening formed at the top of each finger. In one embodiment, the fingers are directly connected to a shuttle valve that controls the air pressure and vacuum provided to the fingers. In another embodiment, the fingers are connected to an air ring disposed about the fingers and the air ring is connected to the shuttle valve.

Separated labels are delivered to the label stretching assembly by the label separating assembly using the intermittent drive wheels, as discussed above, to direct the label off the mandrel and onto the fingers of the label stretching assembly. The label is positioned over the fingers of the label stretching assembly while the fingers are in the contracted position.

In some embodiments, the label stretching assembly may include optical sensors to confirm the proper alignment of the label on the fingers. Additionally, the fingers may be rapidly and partially opened and closed to create a "shaking" effect in order to correctly align the labels on the fingers. Once the label is properly aligned on the fingers, a vacuum is then applied to the fingers to hold the label against the outer surface of the fingers.

With vacuum applied, the fingers are then moved to the expanded position by movement of the cam plate, thereby stretching the label. In one embodiment of the label stretching assembly of the present invention, an annular ring is disposed about the fingers such that when the fingers are in the expanded position, the fingers engage the ring with the label held frictionally therebetween. Such frictional engagement aids in holding the label in place during application of the label to the container.

In the expanded position, the fingers and the stretched label define an annular configuration with an open central space for receiving the container to be labeled. The central space comprises a generally cylindrical shape having a frusto-conical top. The upper diameter of the frusto-conical top is configured to be sized slightly larger than the diameter of the top of the container to be labeled, such as the neck of a bottle. This permits the top of the container to pass trough the top of the expanded label.

The container is then moved upwardly into the central space using a container transport mechanism, such as an elevator arm. When the container is properly positioned in the central space in relation to the label, as determined by optical or laser sensors, the vacuum holding the label is reversed by the shuttle switch and air pressure is applied to the openings in the fingers. The air pressure forms a cushion of air between the fingers and the label, thereby reducing the friction between the fingers and the label and allowing the label to frictionally engage the container, and disengage from the fingers, as the container passes through the central opening.

Once the label is applied to the container, the container is transported away from the label stretching assembly, such as by means of an extractor mechanism, and the fingers are returned to the contracted position to receive the next label.

In one embodiment of the present invention, a plurality of label stretching assemblies may be disposed in series so that, for example, labels can be positioned on one set of fingers, while a container is being labeled by another set of fingers, while still another set of fingers is returning to the contracted position for receipt of another label. It is envisioned that such an arrangement can be carried out using, for example, a turntable, or turret, configuration.

Additionally, in yet another embodiment of the present invention, a plurality of label stretching assemblies may include a turntable, or turret, configuration, as discussed above, with each assembly radially extendable from the turret. Such a configuration, particularly useful in situations when space is limited, allows for the label feeding assembly and label separating assembly to be radially displaced from the circumference of the turret such that a container delivery mechanism and a container return mechanism may be placed in close proximity to the turret.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
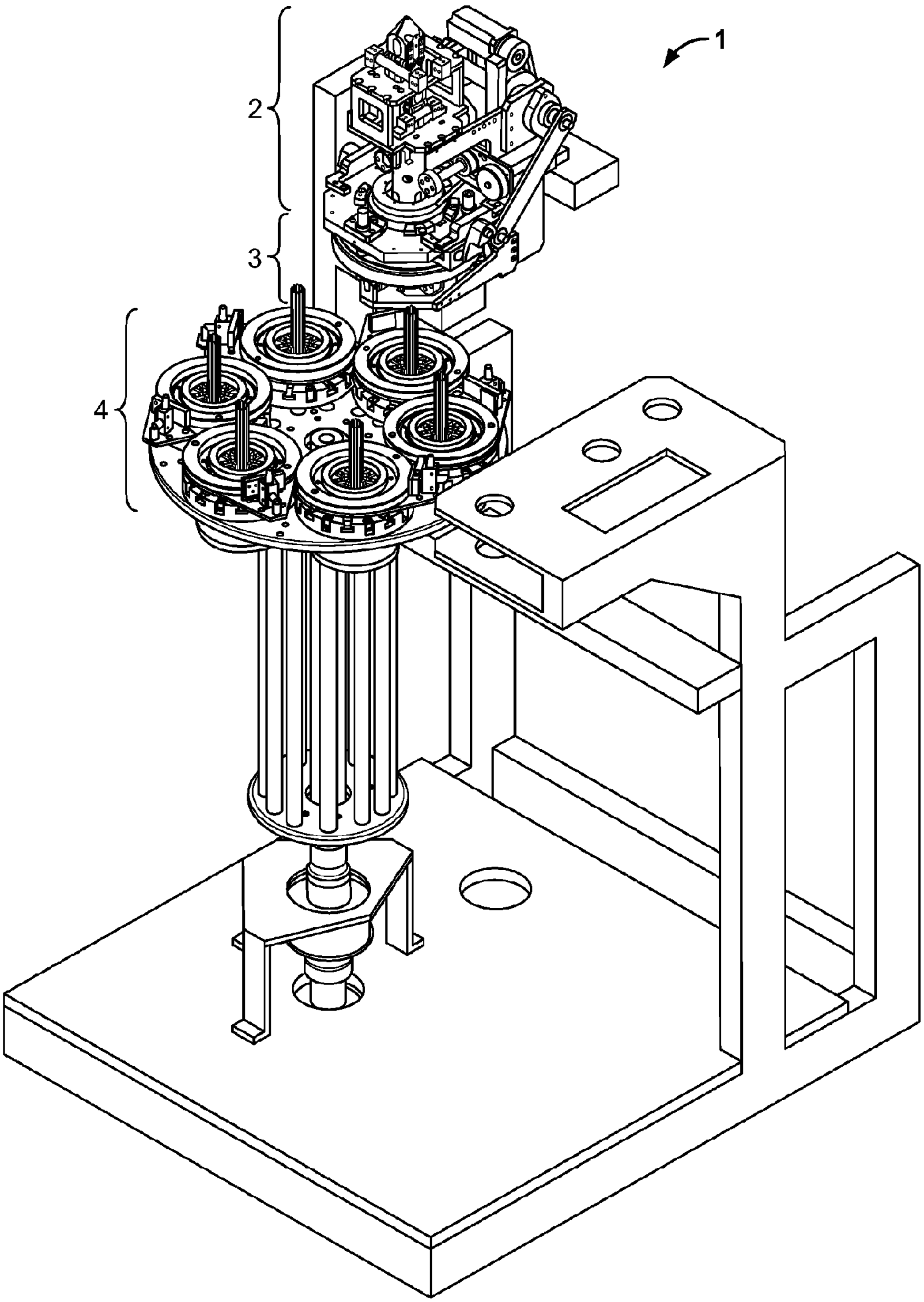
FIG. 1 is a perspective view of the stretch film sleeve label applicator of the present invention in a first embodiment having a label separating assembly using a cam mechanism.

While the present invention is susceptible of embodiment in various forms, there are shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

Figure 35:
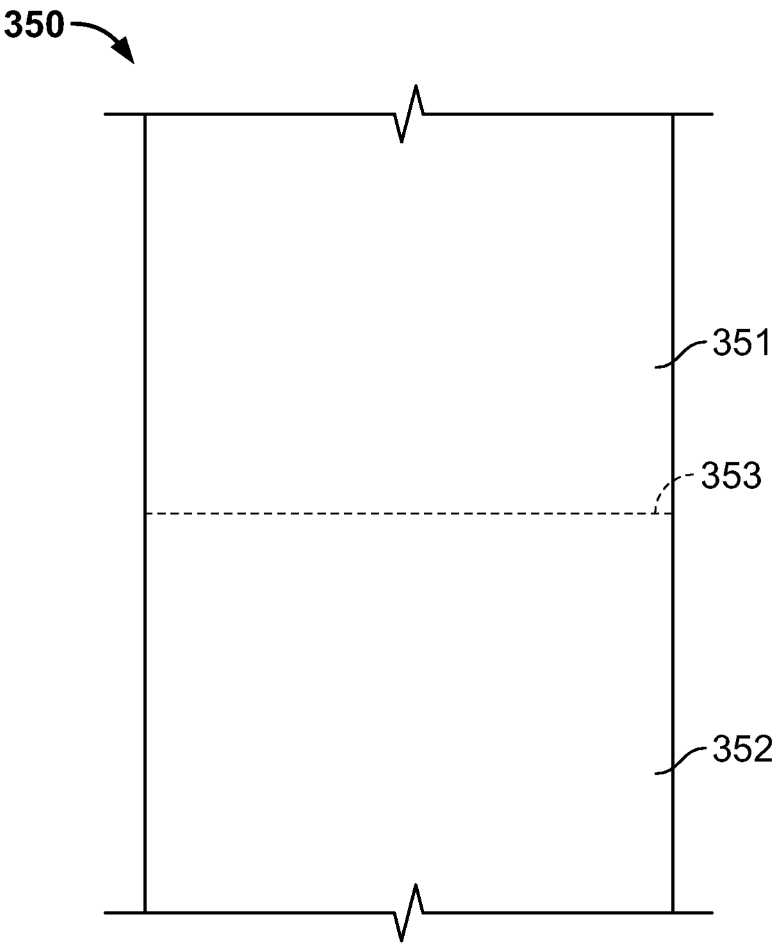

The present invention comprises a stretch film sleeve label applicator for separating a stretchable sleeve label from a web of such labels and applying the label to an item, such as a container. As shown in FIG. 35, web 350 is generally configured either as a continuous, non-perforated sleeve from which individual labels (351, 352) are cut, as further described herein, or web 350 may included pre-cut perforations 353 separating individual labels (351, 2352).

Three primary embodiments of the applicator are disclosed. As shown in FIG. 1, a first embodiment of applicator 1 is configured to separate a continuous web of non-perforated, flat, 2-ply sleeve labels using a cam-driven cutter wheel mechanism.

Figure 2:
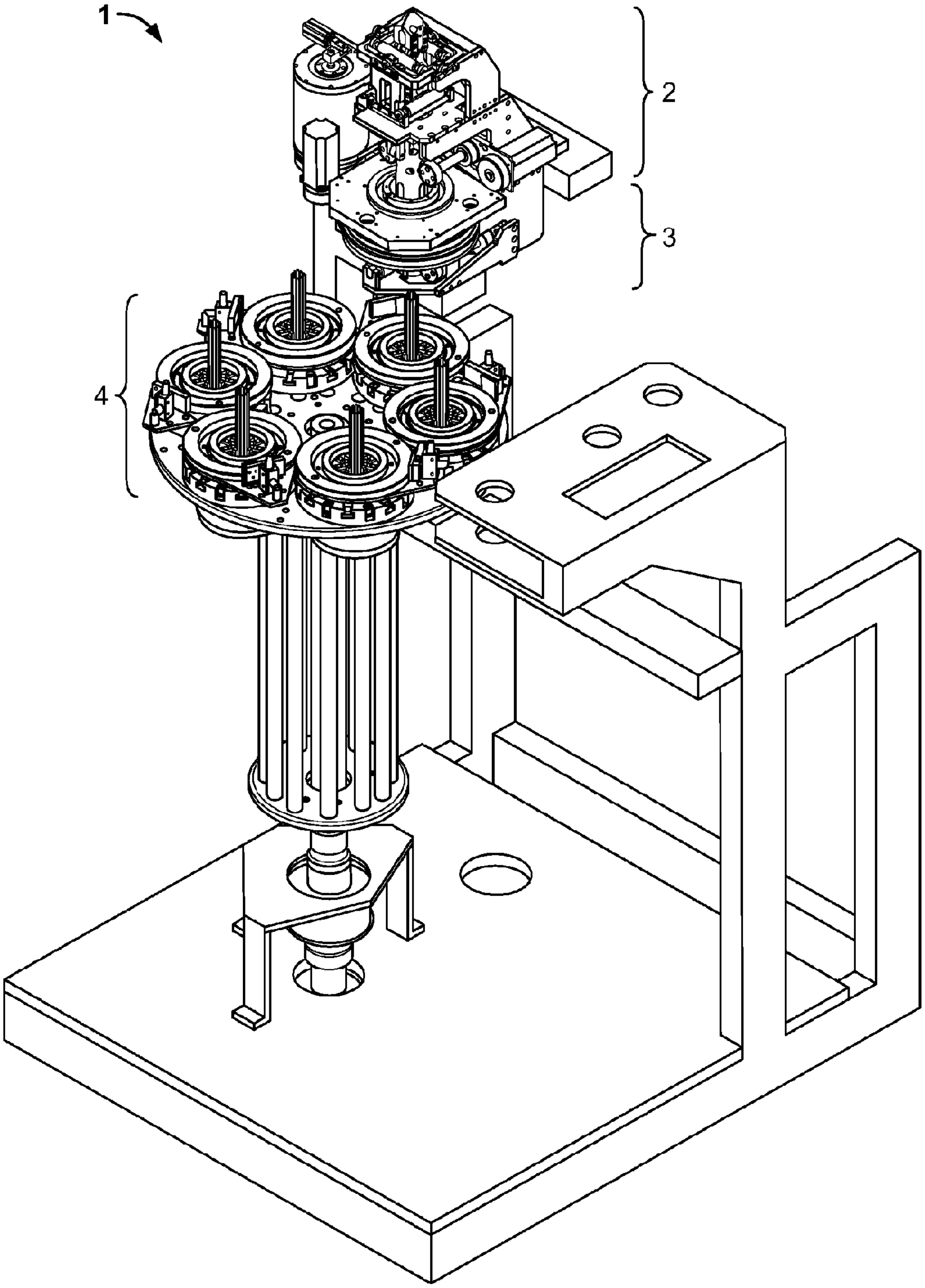
FIG. 2 is a perspective view of the stretch film sleeve label applicator of the present invention in a second embodiment having a label separating assembly using a differential mechanism.

In the second embodiment, shown in FIG. 2, applicator 1 is configured to separate a continuous web of such labels using a differential-driven cutter wheel mechanism. In the third embodiment, as shown in FIG. 3, applicator 1 is configured to separate a continuous web of perforated, flat, 2-ply sleeve labels using a label breaking mechanism.

In each of the three primary embodiments, applicator 1 is configured to open the continuous sleeve of labels, separate an individual label from a next successive label, stretch the label to permit its application to an item to be labeled, such as a container, and apply the label in an accurate and precise location on the container.

Additionally, in each of the three primary embodiments, applicator 1 comprises three primary components: a label feeding assembly 2, a label separating assembly 3 and a label stretching assembly 4. Label feeding assembly 2, label separating assembly 3 and label stretching assembly 4 preferably are interactively coupled to one another such that a continuous sleeve of labels is fed into applicator 1 by label feeding assembly 2, individual labels are separated from the sleeve by label separating assembly 3 and the labels are applied to containers by label stretching assembly 4.

Figure 3:
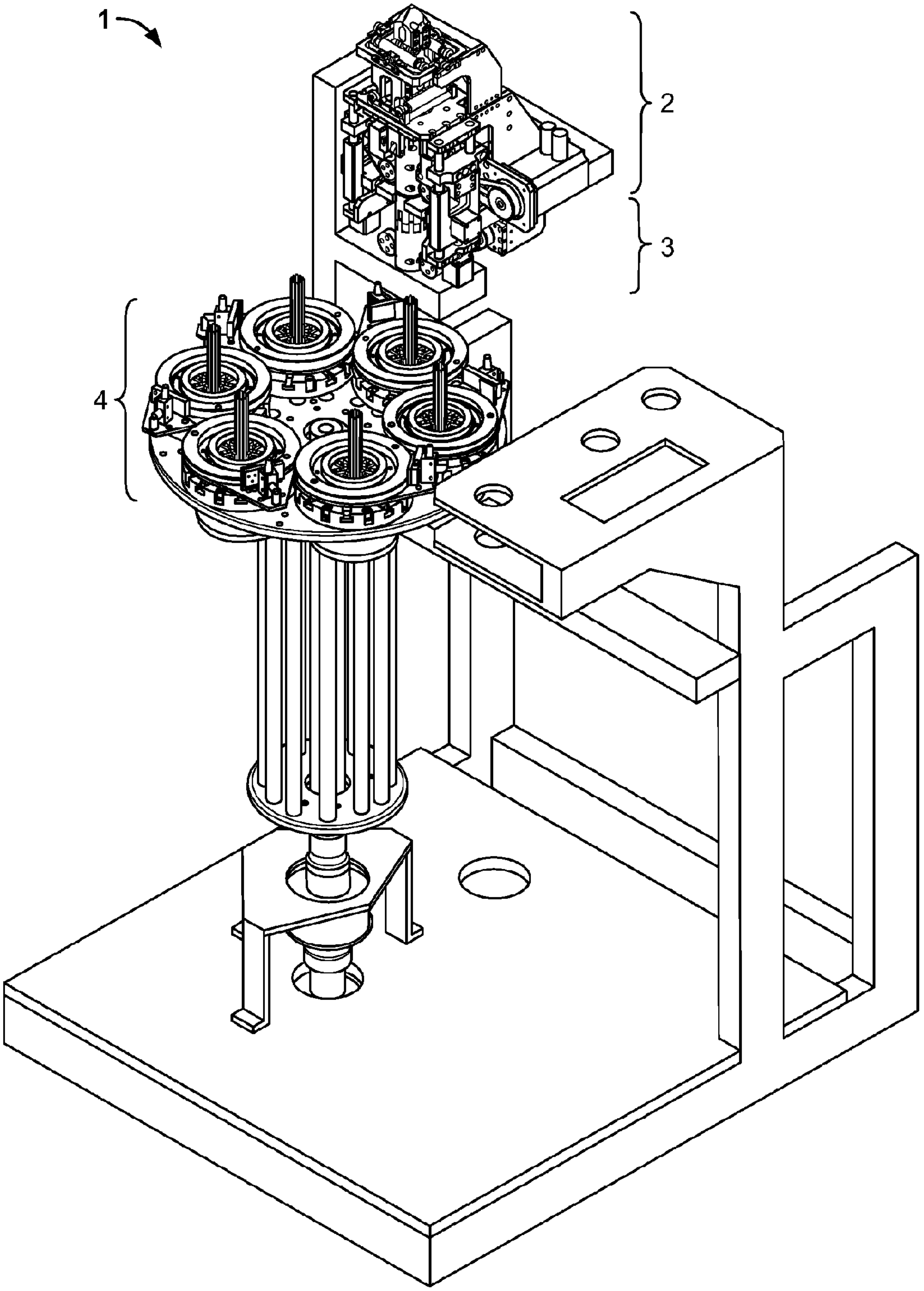
FIG. 3 is a perspective view of the stretch film sleeve label applicator of the present invention in a third embodiment having a label separating assembly using a label breaking mechanism.
Figure 4:
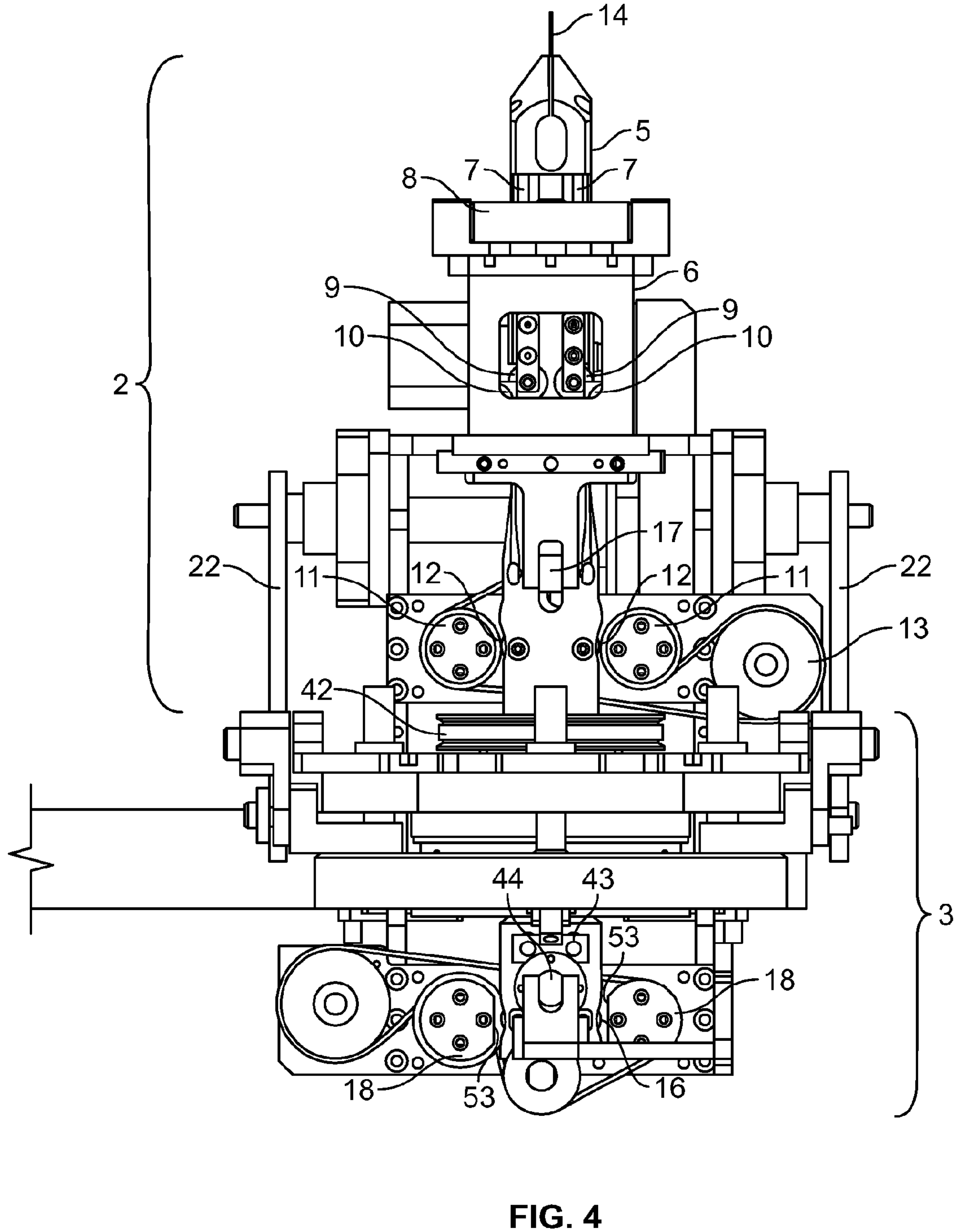
FIG. 4 is an enlarged front view of the label feeding assembly and the label separating assembly of the stretch film sleeve label applicator as shown in FIG. 1.
Figure 5:
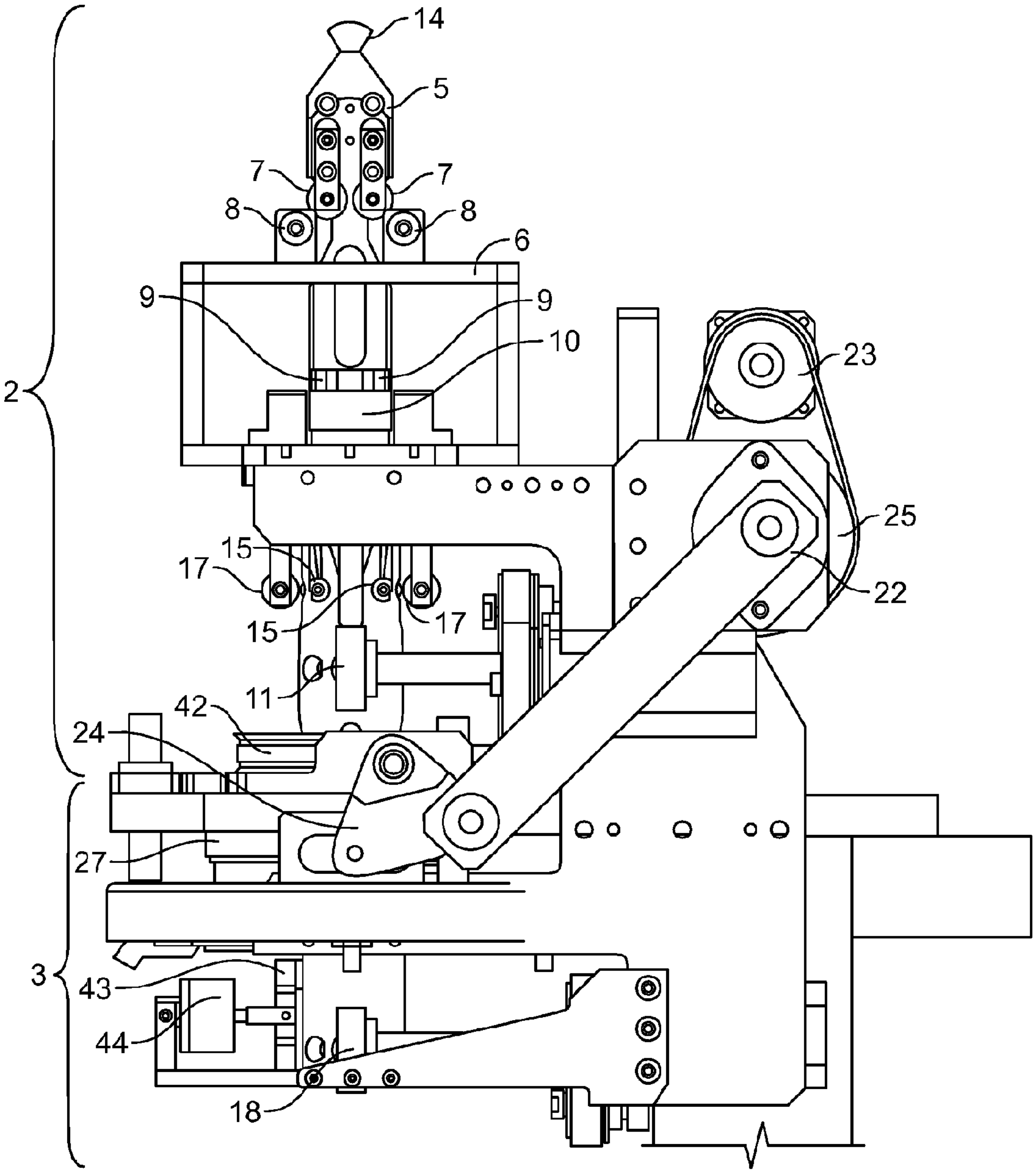
FIG. 5 is an enlarged left side view of the label feeding assembly and the label separating assembly of the stretch film sleeve label applicator as shown in FIG. 1.
Figure 6:
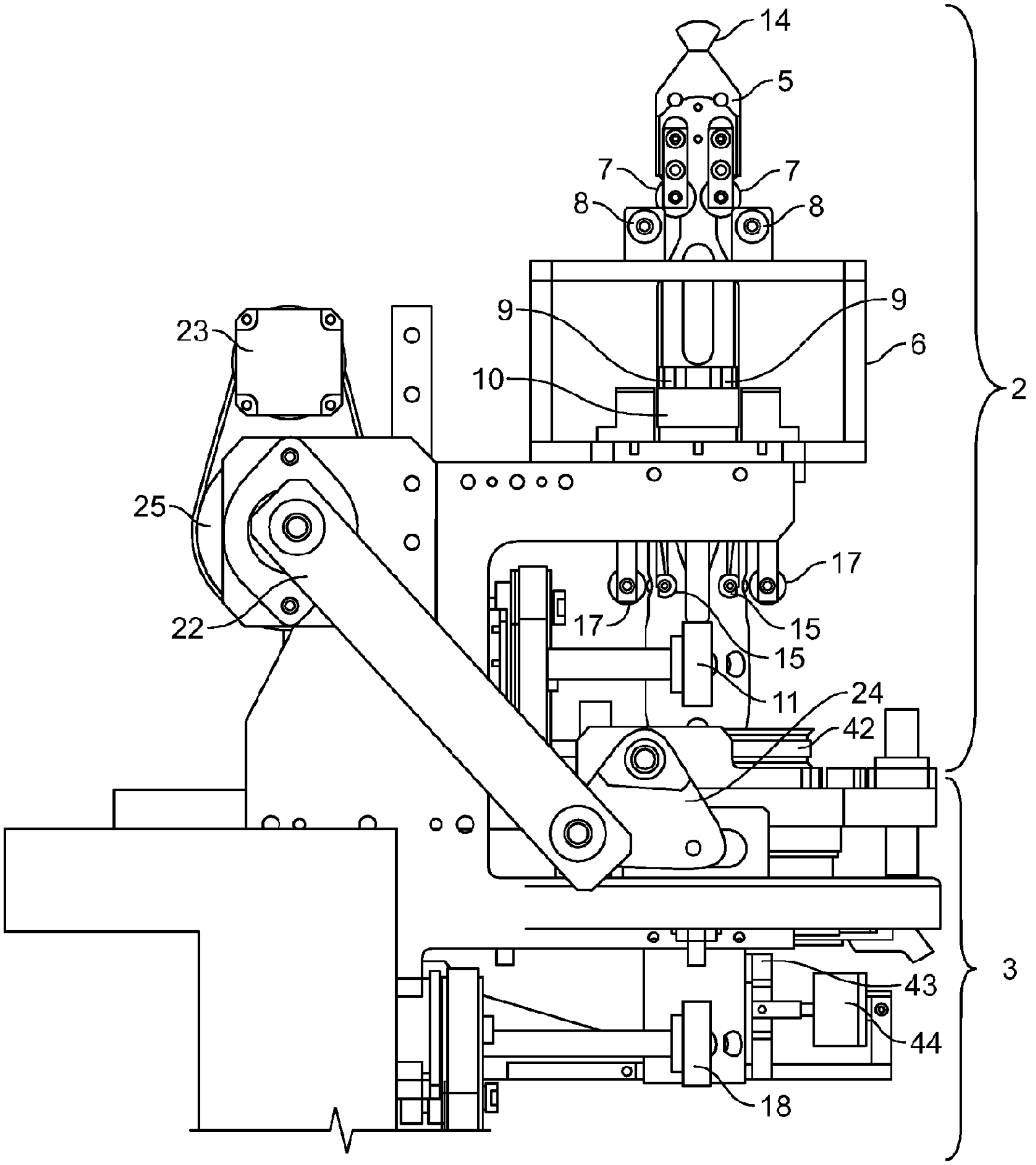
FIG. 6 is an enlarged right side view of the label feeding assembly and the label separating assembly of the stretch film sleeve label applicator as shown in FIG. 1.
Figure 7:
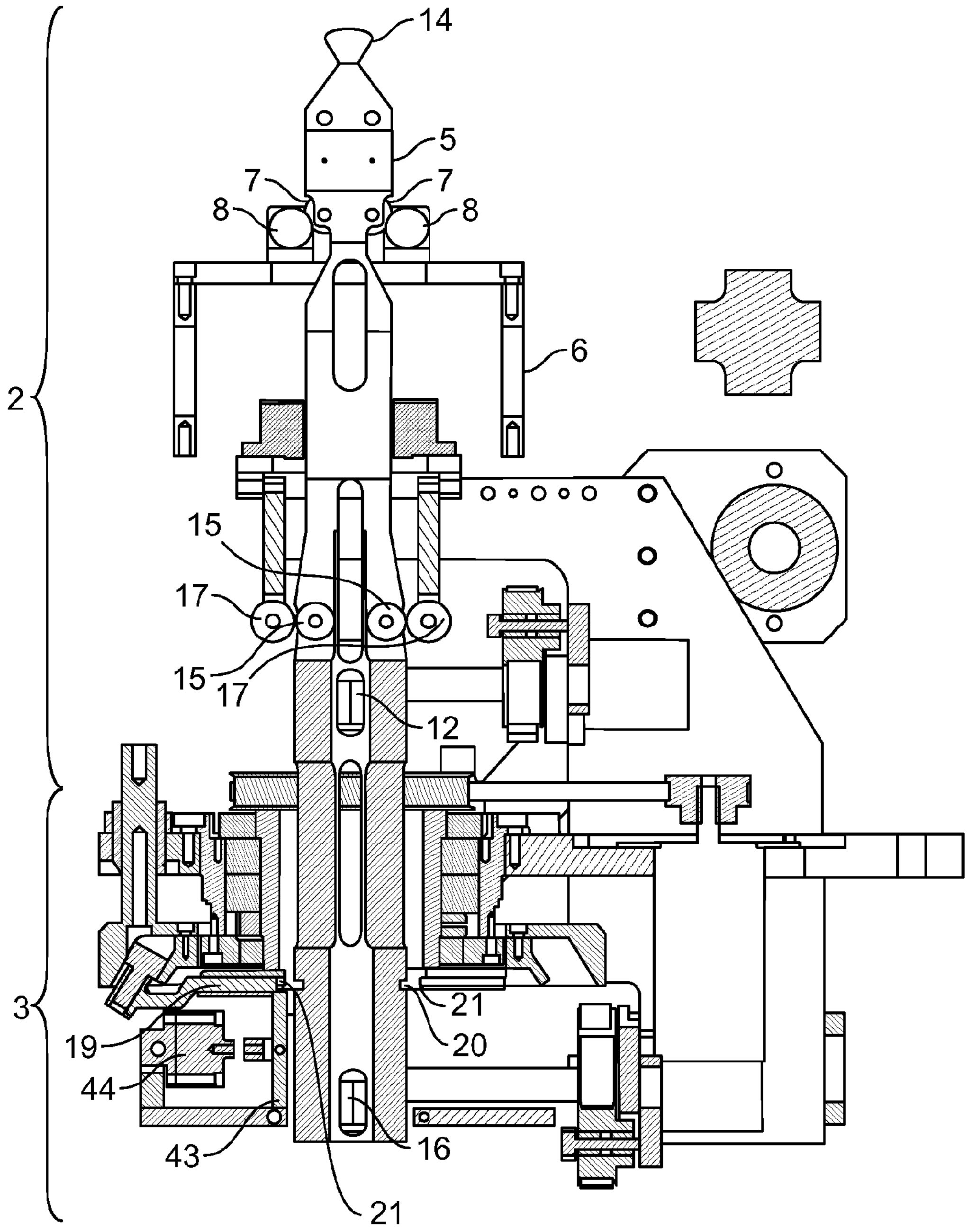
FIG. 7 is an enlarged cross-sectional side view of the label feeding assembly and the label separating assembly of the stretch film sleeve label applicator as shown in FIG. 1.
Figure 8:
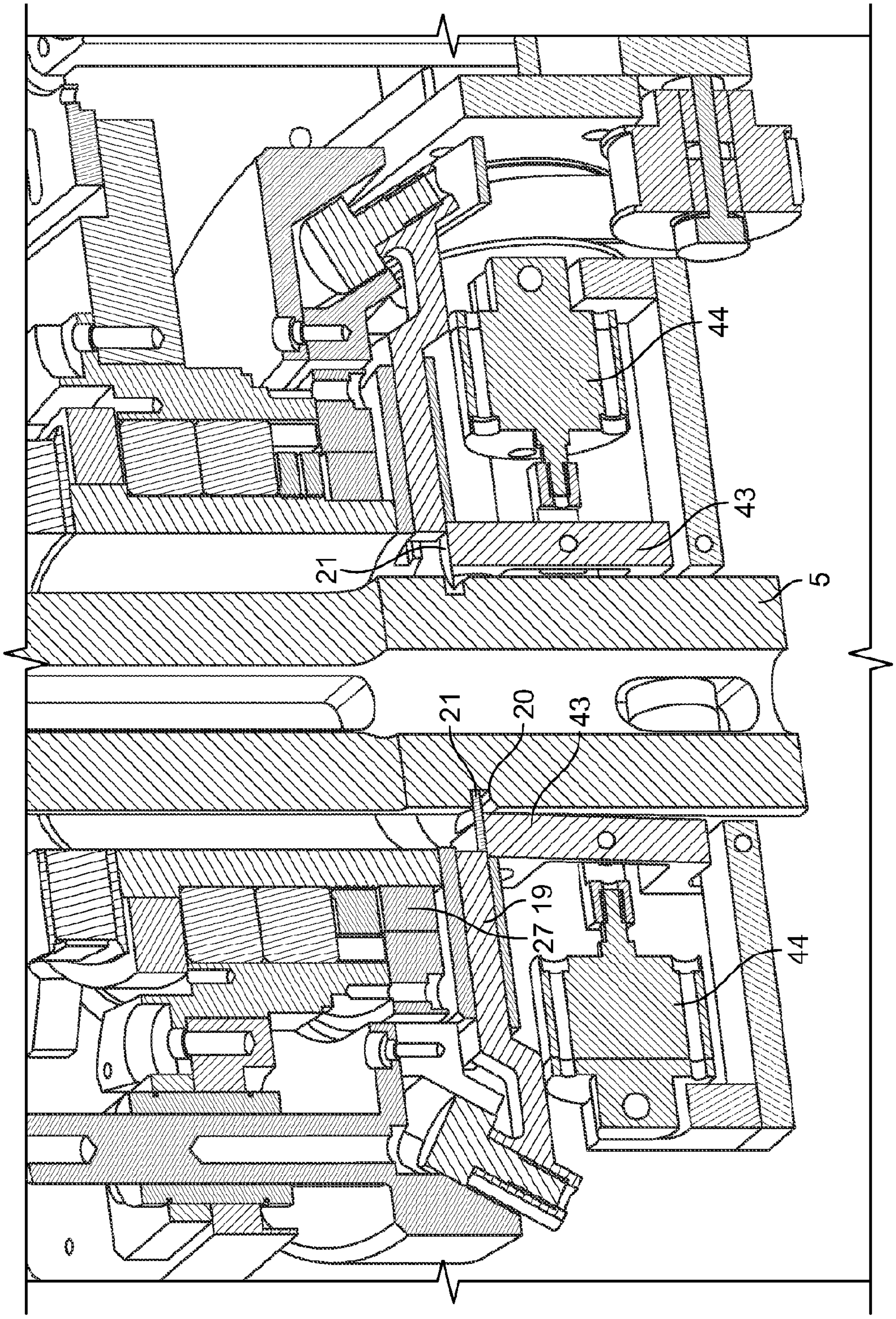
FIG. 8 is an enlarged cross-sectional perspective view of the label feeding assembly and the label separating assembly of the stretch film sleeve label applicator as shown in FIG. 1.
Figure 8A:
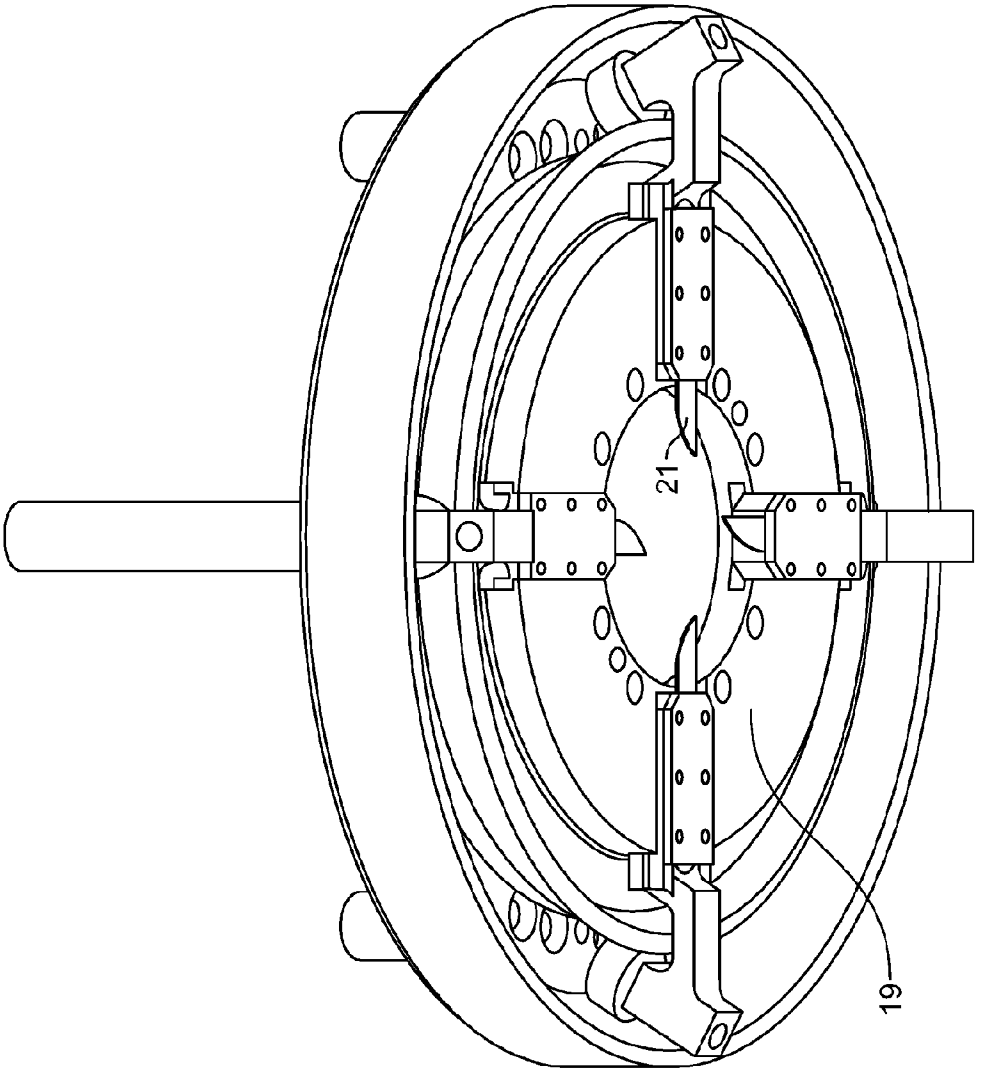
FIG. 8A is an enlarged perspective view of the cutter wheel in the preferred embodiment of the stretch film sleeve applicator as shown in FIG. 1.

As shown in FIGS. 1-3, in each primary embodiment of applicator 1 of the present invention, label feeding assembly 2 is disposed at the uppermost portion of applicator 1. Although the instant description of label feeding assembly 2 makes references to the figures for the first primary embodiment of applicator 1 of the present invention, it will be appreciated that the components and configuration of label feeding assembly 2 are essentially consistent across each of the disclosed primary embodiments of applicator 1, with any substantial differences discussed below.

As shown in additional detail in FIGS. 4-7, label feeding assembly 2 comprises a mandrel 5 mounted in a vertical orientation within a frame 6 of applicator 1. Mandrel 5 is mounted to frame 6 of applicator 1 using a gimbal-style mounting system of opposed roller bearings.

Upper mandrel roller bearings 7 are integrated within, and on opposing sides of, mandrel 5 and are configured to matingly engage with upper frame roller bearings 8 mounted to frame 6. Similarly, lower mandrel roller bearings 9 are integrated within, and on opposing sides of, mandrel 5 and are configured to matingly engage with lower frame roller bearings 10 mounted to frame 6.

This gimbal-style mounting system allows mandrel 5 to move, or pivot, to a slight degree along axes in the horizontal plane (relative to the longitudinal axis of mandrel 5) to accommodate for movements of applicator 1 and/or the sleeve during use of applicator 1 and to maintain the sleeve in a substantially linear and vertical orientation.

Mandrel 5 extends downwardly through label feeding assembly 2 and label separating assembly 3 and defines a guide path along which the sleeve travels through applicator 1. To that end, label feeding assembly 2 further comprises a pair of opposed feed wheels 11 disposed on opposite sides of mandrel 5 and matingly engaged with feed roller bearings 12.

Feed wheels 11 are configured to frictionally engage the sleeve between feed wheels 11 and feed roller bearings 12 and to direct the sleeve downwardly along mandrel 5. In the preferred embodiment of label feeding assembly 2, feed wheels 11 are belt driven by motor 13 and rotate at the same speed.

In one embodiment of label feeding assembly 2, used with the third primary embodiment of applicator 1 of the present invention (as further discussed below), and particularly useful for elongated sleeves of perforated stretch film labels, feed wheels 11 may be substituted by, or supplemented with, a feed belt system (shown in one embodiment in FIG. 33) configured to frictionally engage the sleeve against mandrel 5 over an extended area without causing premature separation of the labels from one another at the perforations.

Figure 9:
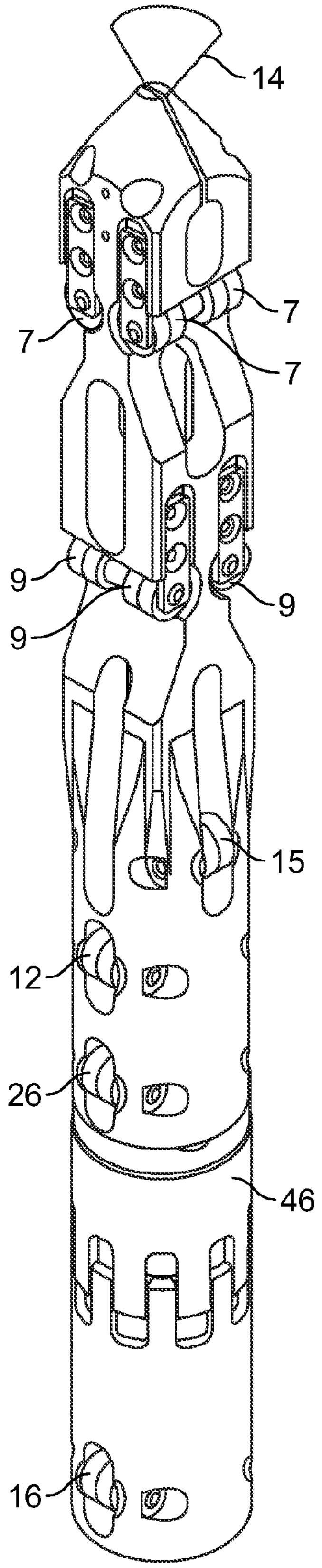
FIG. 9 is an enlarged perspective view of the mandrel in the preferred embodiment of the stretch film sleeve label applicator of the present invention.
Figure 10:
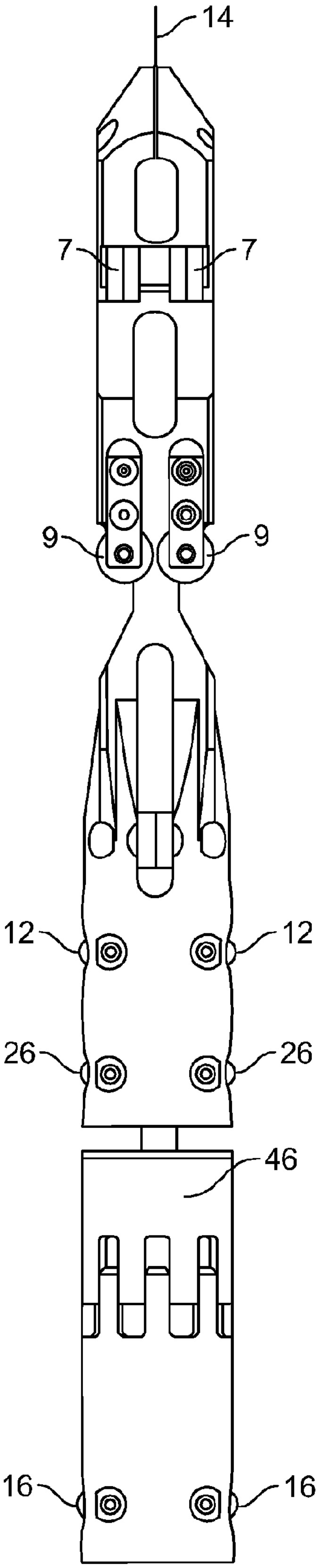
FIG. 10 is an enlarged front view of the mandrel in the preferred embodiment of the stretch film sleeve label applicator of the present invention.
Figure 11:
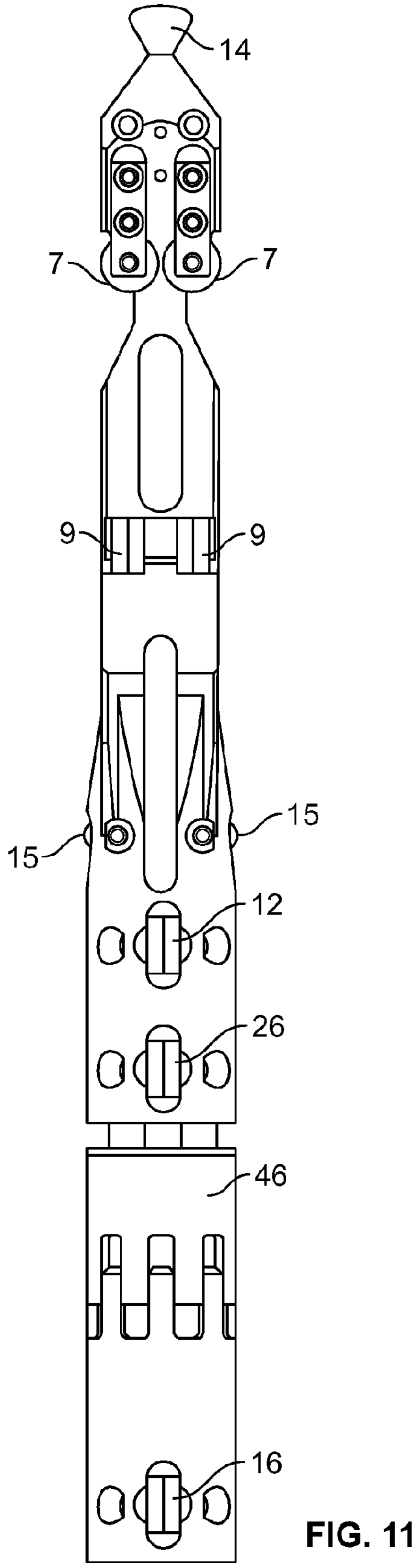
FIG. 11 is an enlarged side view of the mandrel in the preferred embodiment of the stretch film sleeve label applicator of the present invention.
Figure 12:
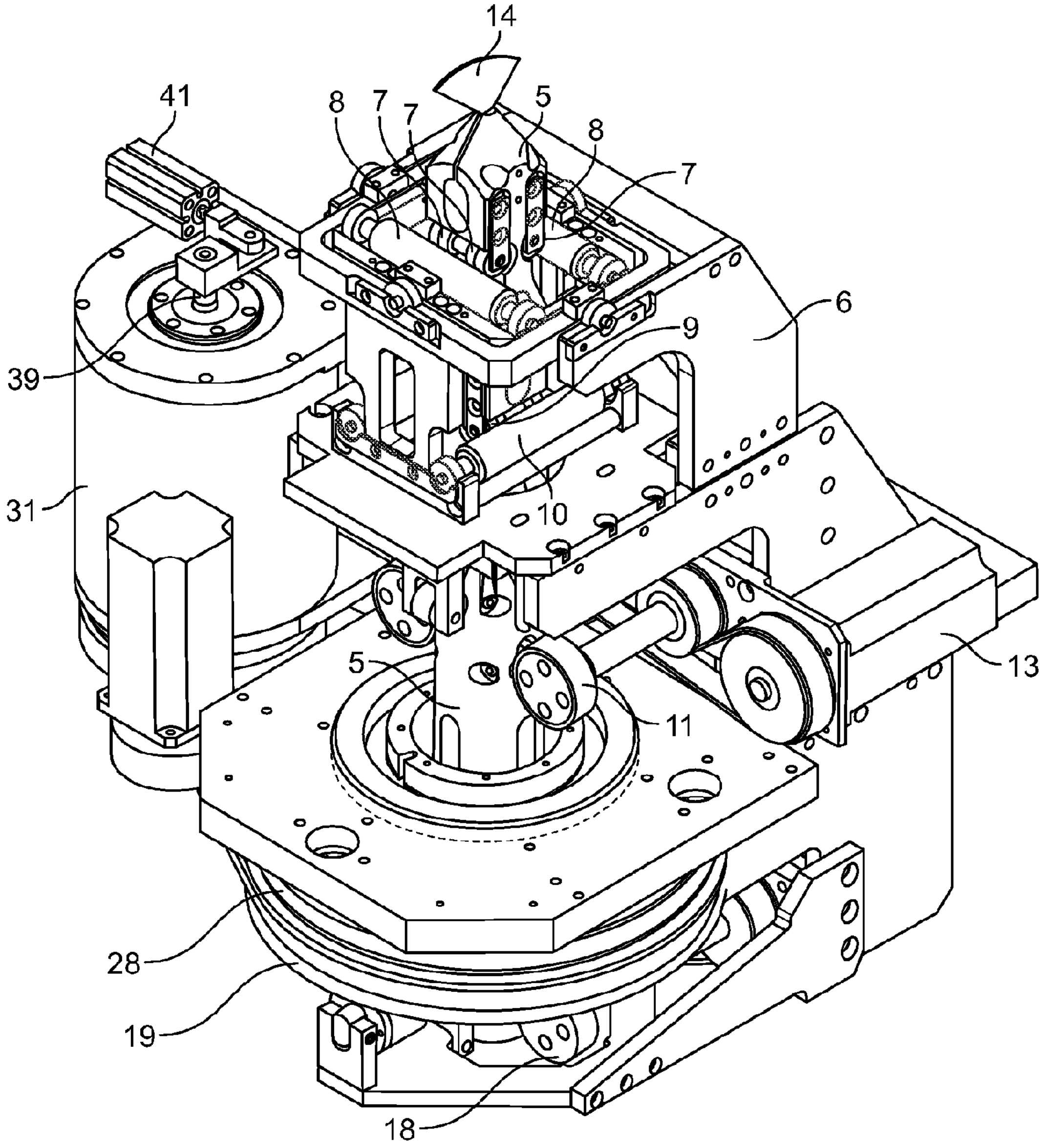
FIG. 12 is an enlarged perspective view of the label feeding assembly and the label separating assembly of the stretch film sleeve label applicator as shown in FIG. 2.
Figure 13:
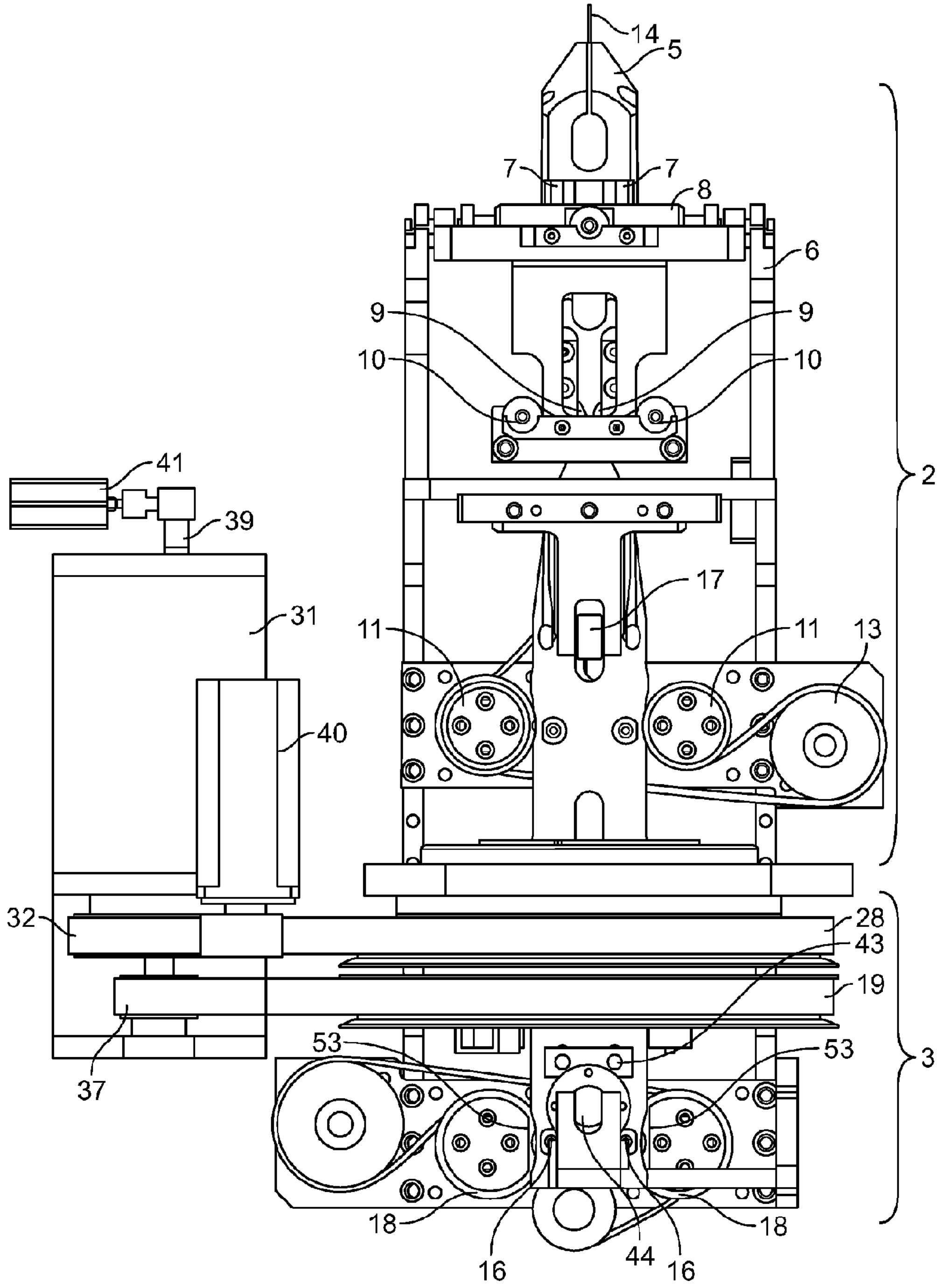
FIG. 13 is an enlarged front view of the label feeding assembly and the label separating assembly of the stretch film sleeve label applicator as shown in FIG. 2.
Figure 14:
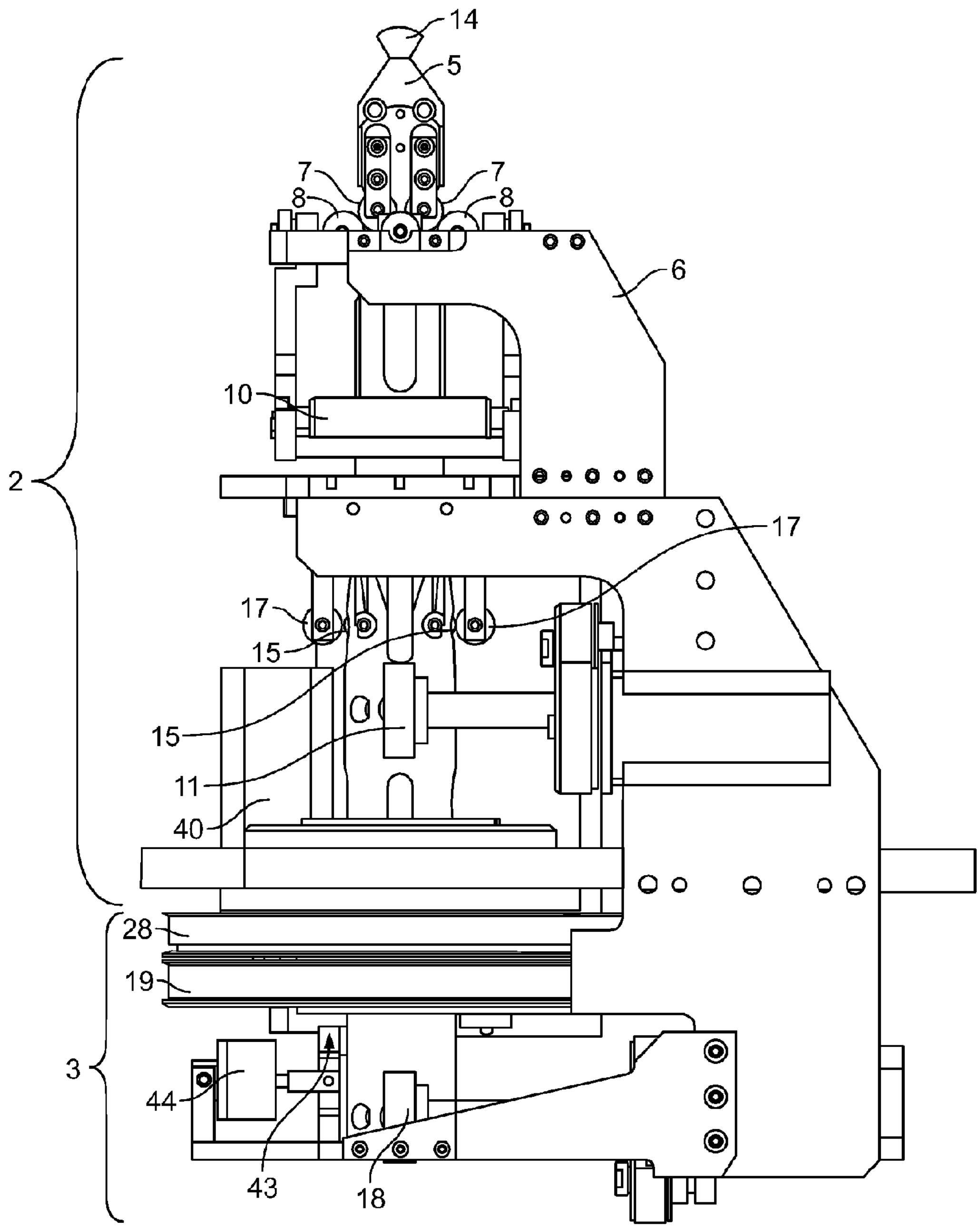
FIG. 14 is an enlarged left side view of the label feeding assembly and the label separating assembly of the stretch film sleeve label applicator as shown in FIG. 2.
Figure 15:
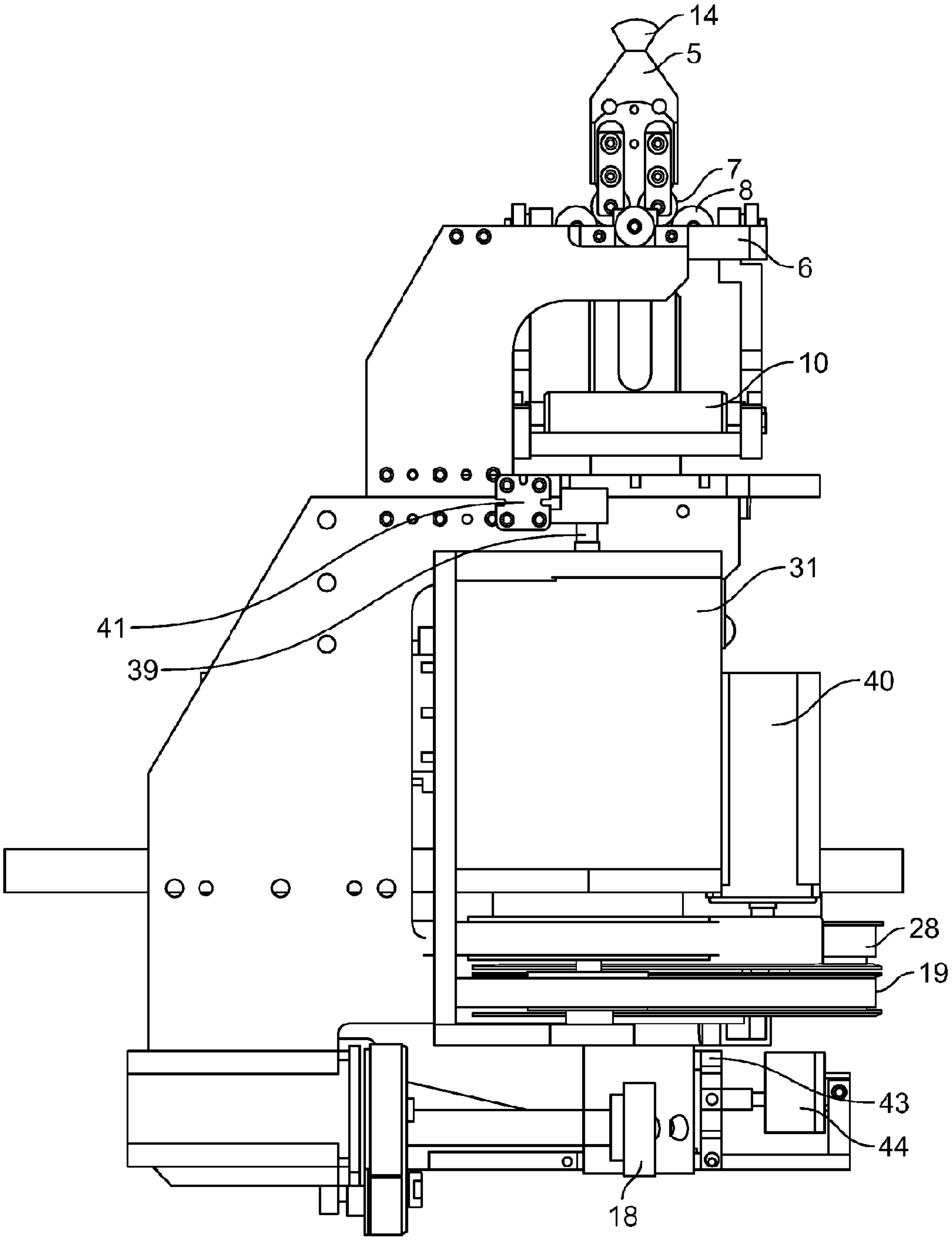
FIG. 15 is an enlarged right side view of the label feeding assembly and the label separating assembly of the stretch film sleeve label applicator as shown in FIG. 2.

As shown in FIGS. 9-11, mandrel 5 is further configured to open the sleeve of stretch film label material and impart upon the sleeve the general shape of the container to be labeled, typically a highly contoured, but generally cylindrical, bottle. Thus, mandrel 5 preferably comprises a generally square cross-section at its upper portion that transitions to a generally circular cross-section at its lower portion.

It will be appreciated, however, that the cross-sectional shape of mandrel 5 may vary depending upon the shape of the container to be labeled and upon whether a single, stationary label stretching assembly 4 is used, or whether multiple, moving label stretching assemblies 4 are used, as further discussed below.

For example, if multiple, moving label stretching assemblies 4 are used, it may be advantageous for mandrel 5 to have an oblong or square cross-section at its lower portion, in order to create a larger cross-sectional area of the sleeve. Such a larger cross-sectional area of the sleeve increases the likelihood that the sleeve will properly engage label stretching assembly 4 as it is transported between label separating assembly 3 and label stretching assembly 4.

Additionally, in one embodiment of mandrel 5 in the present invention (not shown) mandrel 5 may be formed of two essentially identical vertical halves, joined using adjustable screws or similar means. In this embodiment, the width of mandrel 5 may be adjusted by increasing or decreasing the distance between the two halves of mandrel 5 using the adjustable screws. By adjusting the width of mandrel 5, a single mandrel 5 may be used with a large number of sleeves having different diameters.

The uppermost portion of mandrel 5 is generally conical in shape and includes a separating blade 14 extending upwardly therefrom. Separating blade 14 is configured to enter the flat sleeve of stretch film label material and to open the sleeve so that it may pass over mandrel 5 and progressively acquire the desired shape.

In the case of a bottle, as in the preferred embodiment, the sleeve acquires a generally cylindrical shape as it travels downwardly from the top of mandrel 5 to the bottom of mandrel 5 through label feeding assembly 2 and label separating assembly 3. It will be appreciated, however, that the shape of mandrel 5 may vary depending upon the shape of the container to be labeled.

Additionally, it will be appreciated that mandrel 5 may include additional roller bearings along its length configured to properly guide and transport the sleeve as it traverses mandrel 5.

For example, as shown in FIGS. 4-7 and 9-11, in the preferred embodiment of label feeding assembly 2, mandrel 5 includes mandrel guiding roller bearings 15 disposed on opposite sides of mandrel 5. Mandrel guiding roller bearings 15 are configured to matingly engage frame guiding roller bearings 17 mounted to frame 6 and to permit the sleeve to guidingly pass between mandrel guiding roller bearings 15 and frame guiding roller bearings 17. A second set of opposed frame guiding roller bearings 26 also may be included in mandrel 5 and, in cooperation with frame guiding roller bearings 17, configured to engage a feed belt system in the third primary embodiment of applicator 1 of the present invention, as further discussed below.

Similarly, in the preferred embodiment, mandrel 5 includes intermittent drive wheel bearings 16 disposed at the lower portion of mandrel 5 and on opposite sides of mandrel 5. Intermittent drive wheel bearings 16 are configured to matingly engage a pair of intermittent feed wheels 18, as further discussed below.

Label separating assembly 3 is configured to separate individual labels from the continuous sleeve of stretch film labels and to deliver the separated labels to label stretching assembly 4 for application to a container.

In the first and second primary embodiments of applicator 1 of the present invention, label separating assembly 3 is configured to be used for continuous sleeves of non-perforated stretch film labels. To that end, label separating assembly 3 comprises a circumferential cutter wheel 19 that rotates about mandrel 5 and includes a plurality of cutting blades configured to cut the sleeve. Cutter wheel 19 preferably is a large, flange-like element disposed about mandrel 5 and through which mandrel 5 passes. The rotation of cutter wheel 19 about mandrel 5 is controlled by drive wheel 42 connected to a motor (not shown) preferably by a drive belt.

In the first embodiment of applicator 1, as shown in FIGS. 1 and 4-8A, a plurality of cutting blades 21 are slidably mounted to cutter wheel 19 such that cutting blades 21 slide inwardly (radially toward mandrel 5) and outwardly (radially away from mandrel 5), between a cutting position and a non-cutting position, respectively, as cutter wheel 19 rotates about mandrel 5. In this embodiment, mandrel 5 includes a circumferential grove 20 into which cutting blades 21 extend when cutting blades 21 are in the cutting position. Grove 20 allows cutting blades to slide inwardly toward mandrel 5 far enough to pass through the sleeve in order cut the sleeve.

The slidable movement of cutting blades 21 in this embodiment is controlled by a cam mechanism configured to extend cutting blades 21 into the cutting position when the sleeve is in the correct position on mandrel 5 and to retract cutting blades 21 into the non-cutting position once the sleeve is cut.

In the preferred embodiment, the cam mechanism comprises a pair of arms 22 disposed on either side of applicator 1. Arms 22 are orbitally mounted to a drive wheel 25 on one end and rotatably mounted to a pivot plate 24 on the other end. Pivot plate 24 is pivotally mounted to frame 6 of applicator 1 and is also operatively connected to cutter wheel 19 such that the pivoting action of pivot plate 24 serves to extend and retract cutting blades 21 into cutting and non-cutting positions, respectively. Drive wheel 25 preferably is belt-driven by a motor 23.

Preferably, the operative connection between pivot plate 24 and cutter wheel 19 comprises a cam plate arrangement as is known to those skilled in the art. In such an arrangement, cutting blades 21 include integrated fingers (not shown) that travel within a plurality of arcuate tracks formed in a cam plate 27.

Cam plate 27 rotates upon application of force by pivot plate 24. When cam plate 27 rotates in one direction with respect to cutter wheel 19 (as urged by pivot plate 24), the fingers of cutting blades 21 are forced to travel along the tracks of cam plate 27 toward mandrel 5, thereby causing cutting blades 21 to slide radially inward toward mandrel 5 and into a cutting position. When cam plate 27 rotates in the opposite direction with respect to cutter wheel 19, the fingers of cutting blades 21 are forced to travel along the tracks of cam plate 27 away from mandrel 5, thereby causing cutting blades 21 to slide radially outward away from mandrel 5 and into a non-cutting position.

Those skilled in the art will recognize that the slidable movement of cutting blades 21 radially toward and away from mandrel 5 may be accomplished through various means, including by actuators, such as solenoids, operably coupled to each cutting blade. Accordingly, all such alternate means are included within the scope of this disclosure.

The second primary embodiment of applicator 1 of the present invention is shown in FIGS. 2 and 12-20. In this embodiment, label feeding assembly 2 comprises the same components as label feeding assembly 2 of the first primary embodiment. However, label separating assembly 3 differs in that cutter wheel 19 of label separating assembly 3 in this embodiment comprises a plurality of cutting blades 21 that are pivotally mounted to cutter wheel 19, the pivoting movement being controlled by a differential mechanism rather than a cam mechanism as in the first embodiment.

Figure 16:
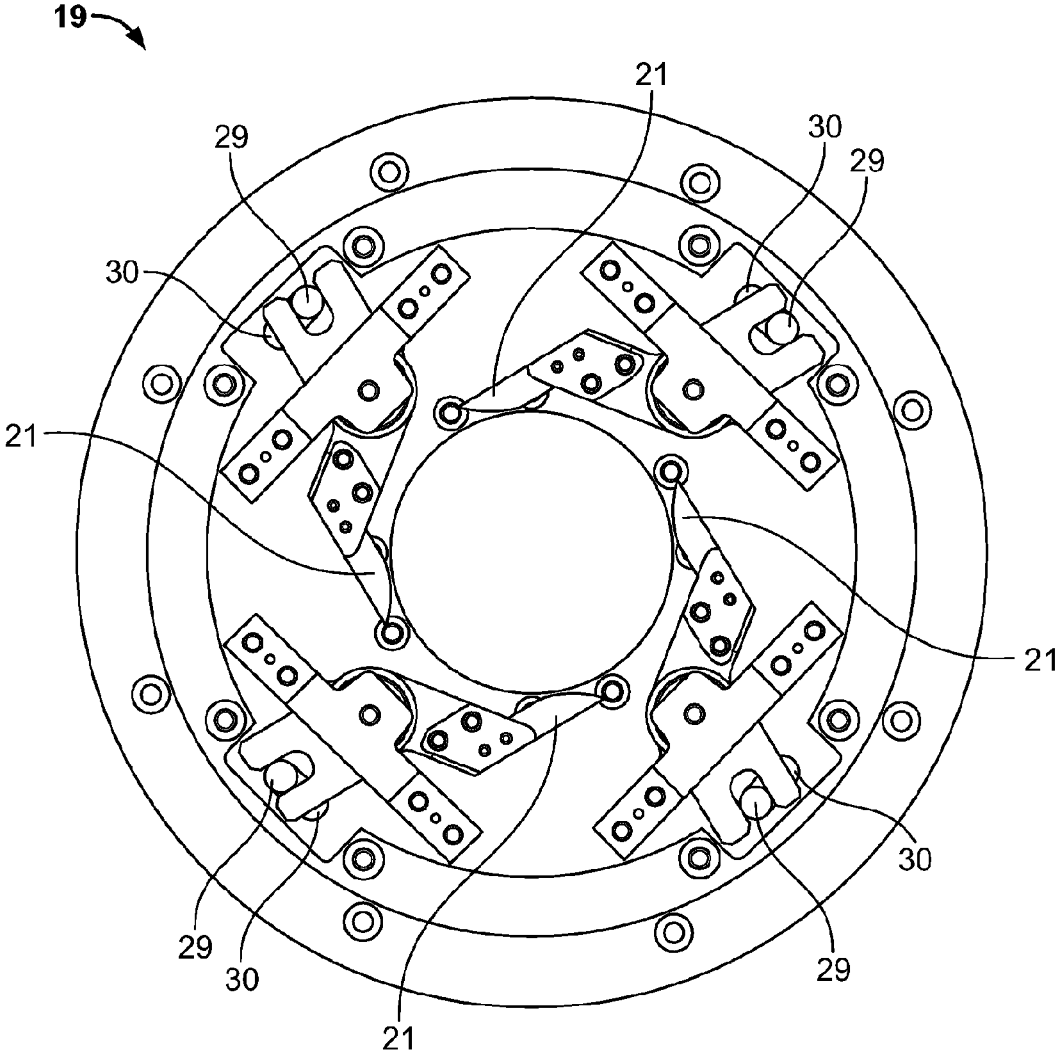
FIG. 16 is an enlarged bottom view of the cutter wheel in the preferred embodiment of the stretch film sleeve label applicator of the present invention as shown in FIG. 2, showing the blades in a non-cutting position.
Figure 17:
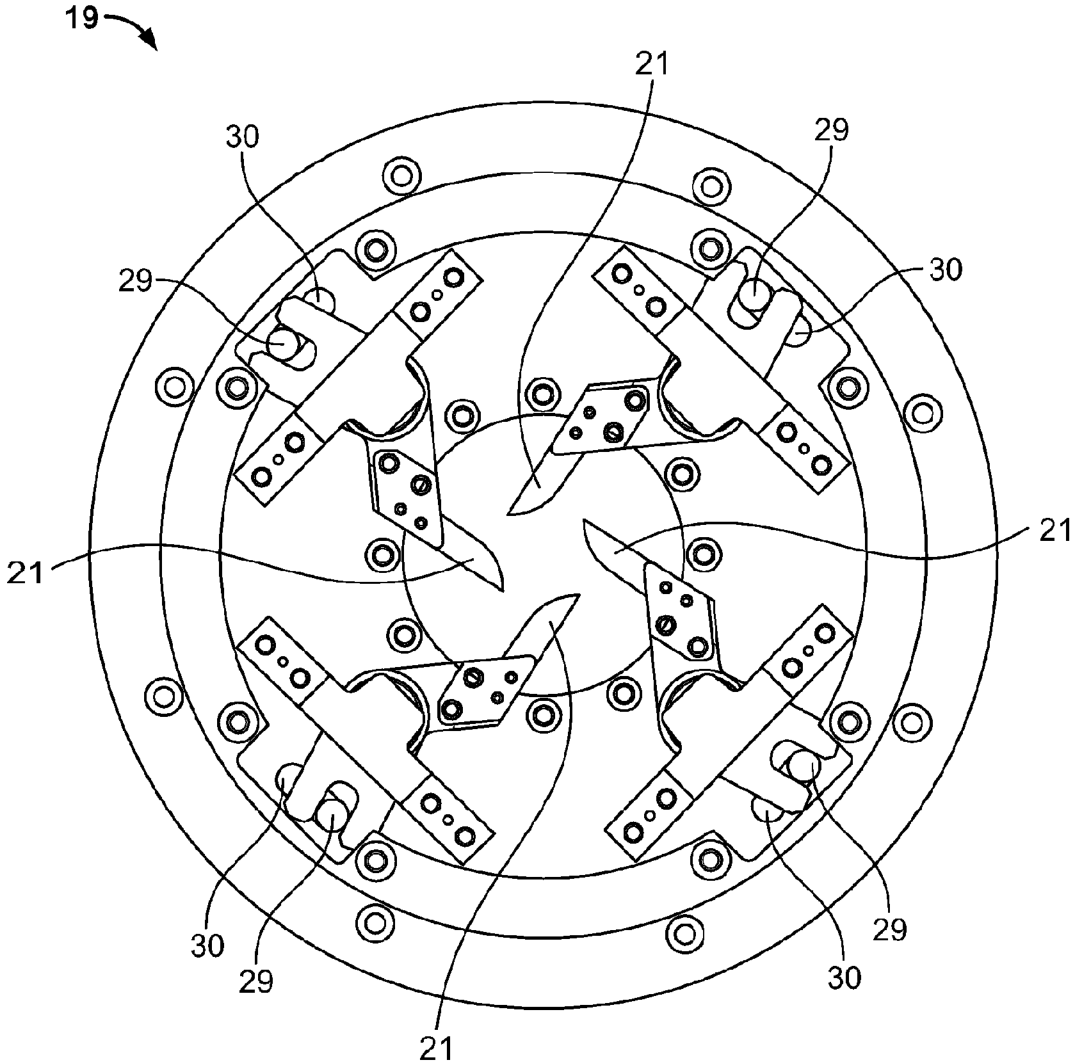
FIG. 17 is an enlarged bottom view of the cutter wheel in the preferred embodiment of the stretch film sleeve label applicator of the present invention as shown in FIG. 2, showing the blades in a cutting position.
Figure 18:
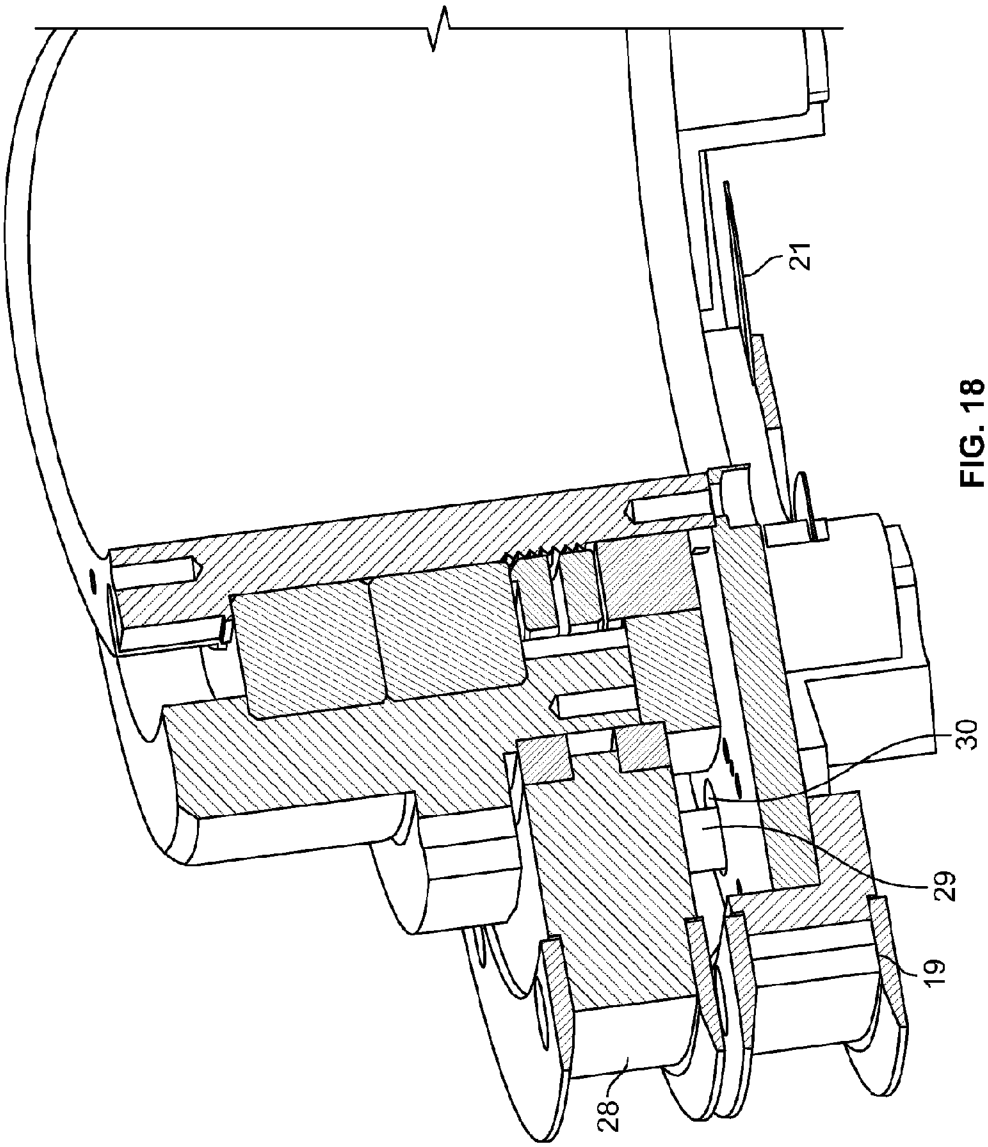
FIG. 18 is an enlarged, cross-sectional, fragmentary perspective view of the label separating assembly of the stretch film sleeve label applicator as shown in FIG. 2.
Figure 19:
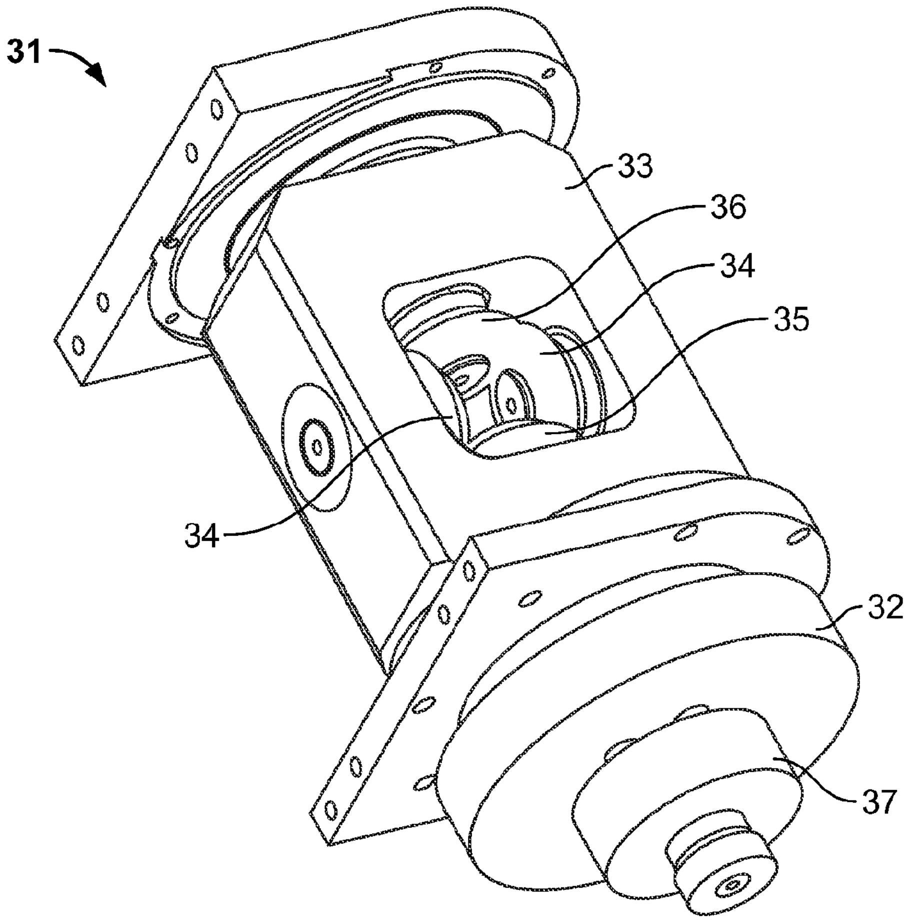
FIG. 19 is an enlarged perspective view of the differential mechanism of the label separating assembly of the stretch film sleeve label applicator as shown in FIG. 2.
Figure 20:
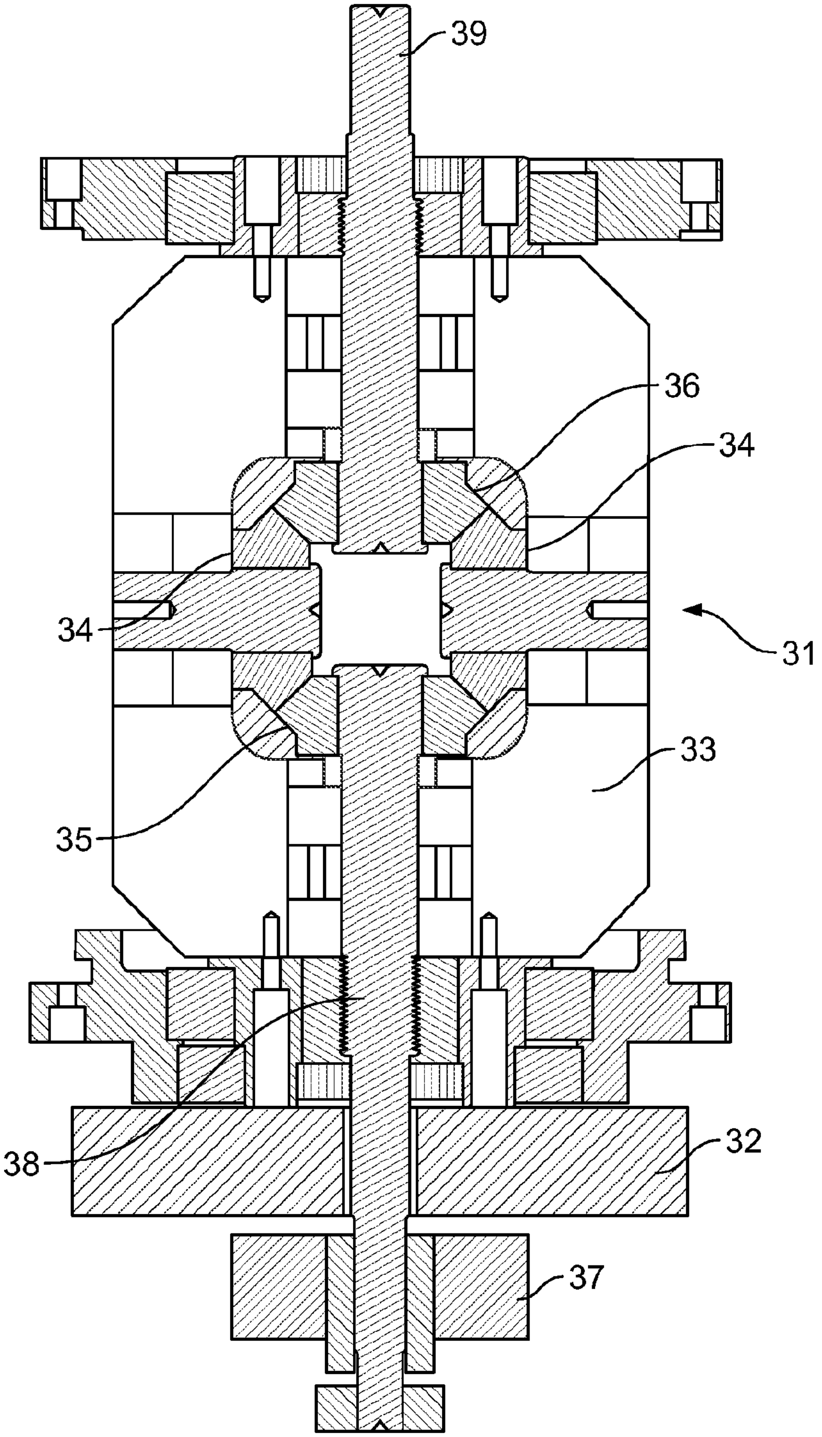
FIG. 20 is an enlarged cross-sectional view of the differential mechanism of the label separating assembly of the stretch film sleeve label applicator as shown in FIG. 2.
Figure 21:
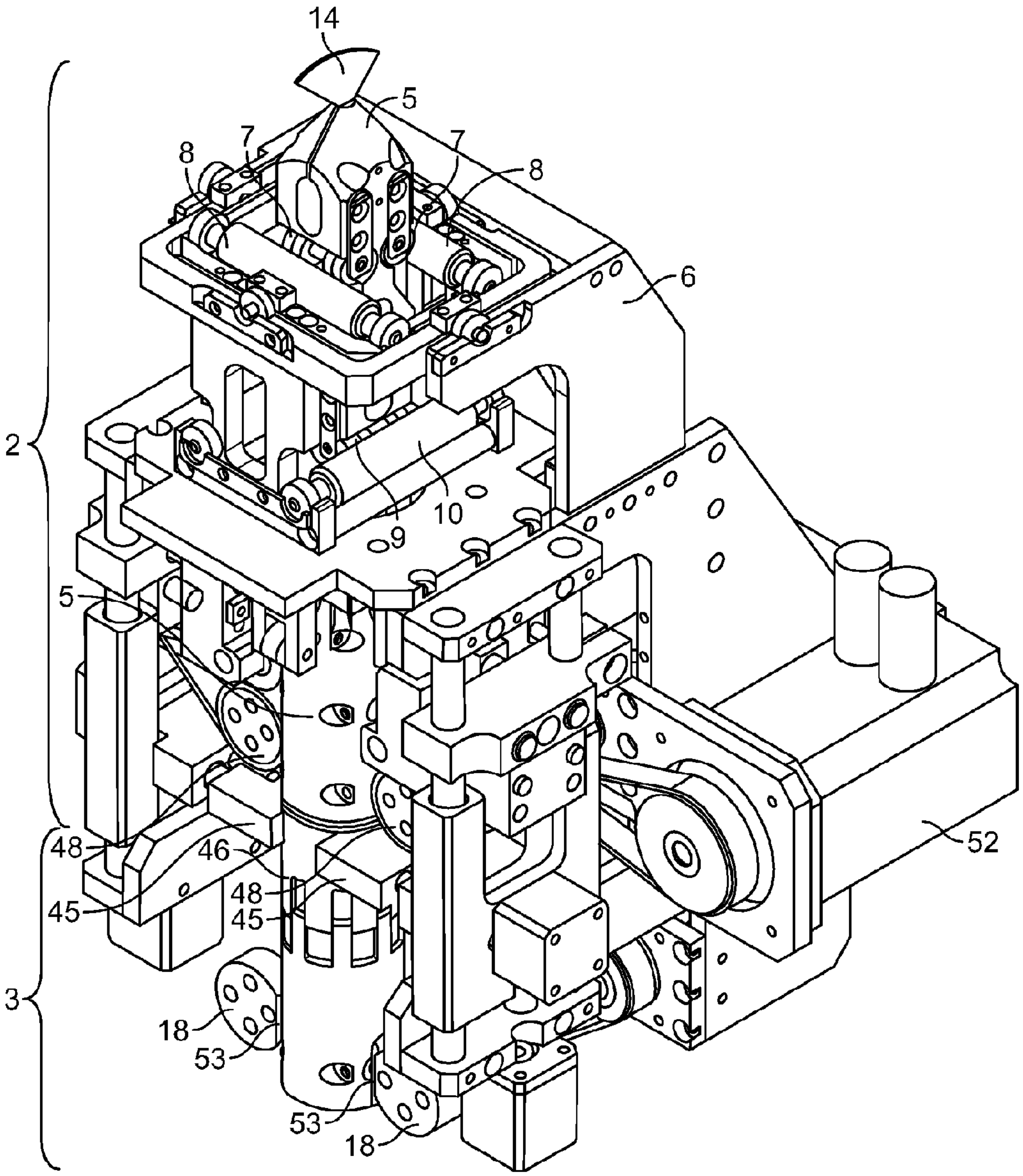
FIG. 21 is an enlarged perspective view of the label feeding assembly and the label separating assembly of the stretch film sleeve label applicator as shown in FIG. 3.
Figure 22:
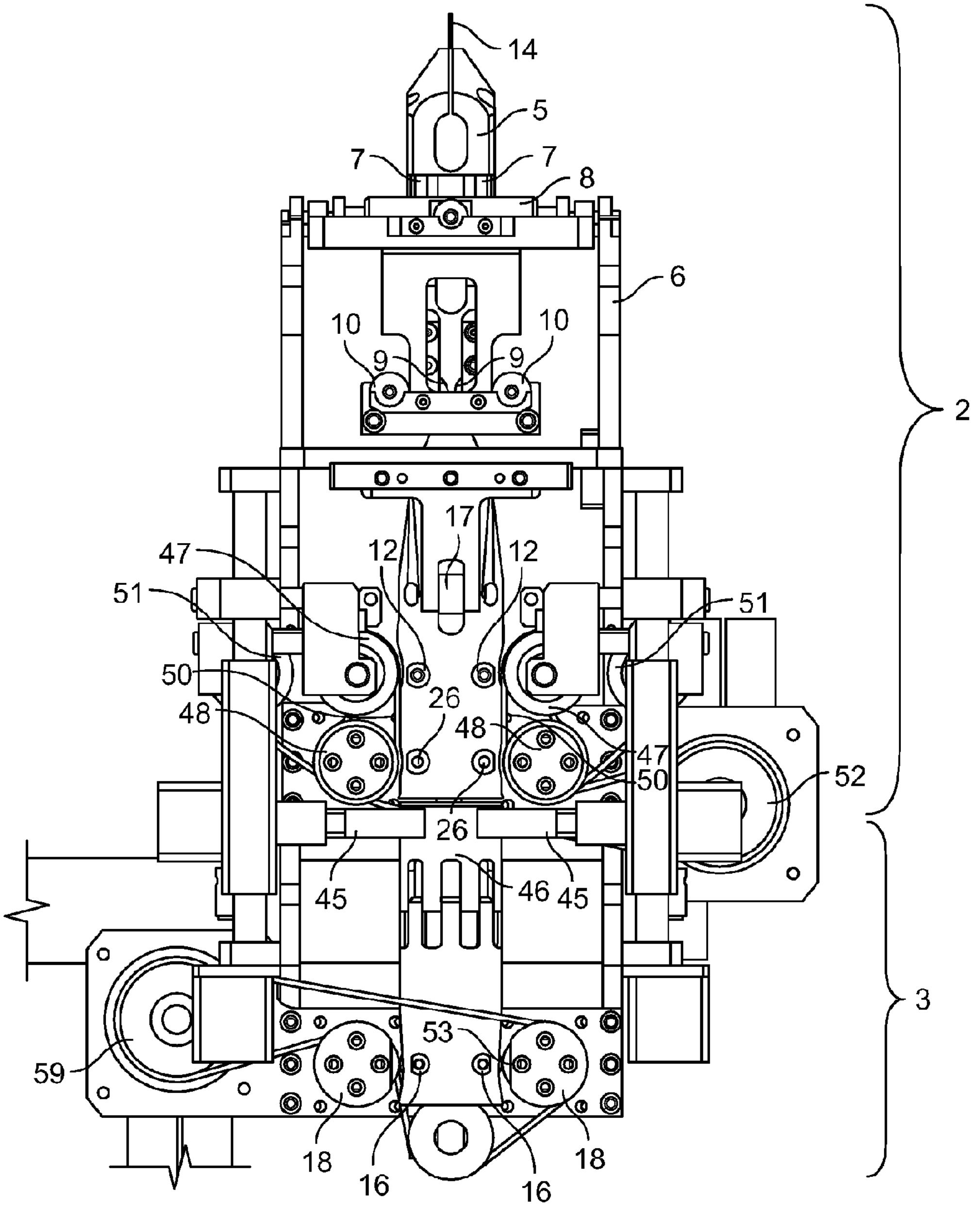
FIG. 22 is an enlarged front view of the label feeding assembly and the label separating assembly of the stretch film sleeve label applicator as shown in FIG. 3.
Figure 23:
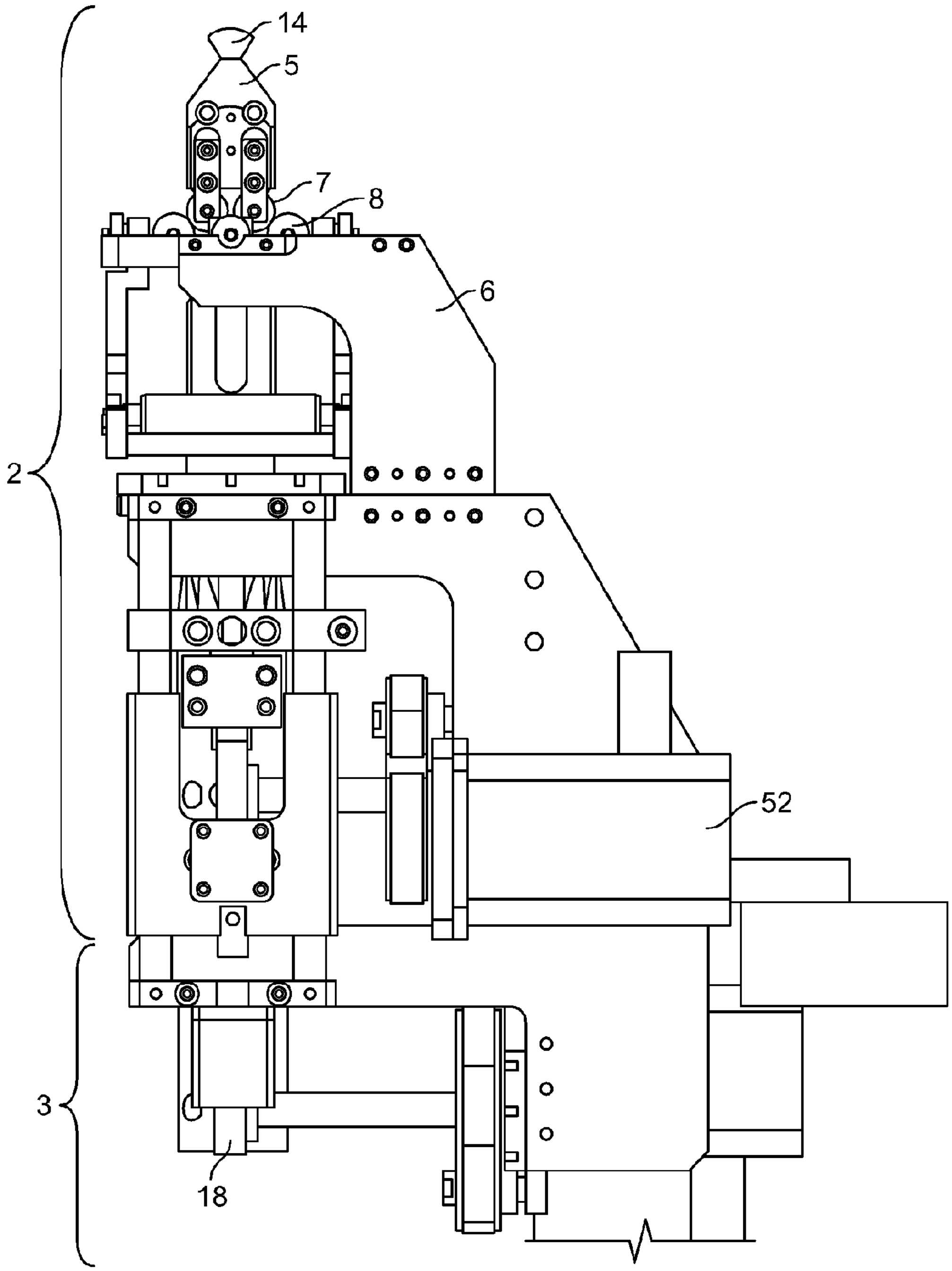
FIG. 23 is an enlarged left side view of the label feeding assembly and the label separating assembly of the stretch film sleeve label applicator as shown in FIG. 3.
Figure 24:
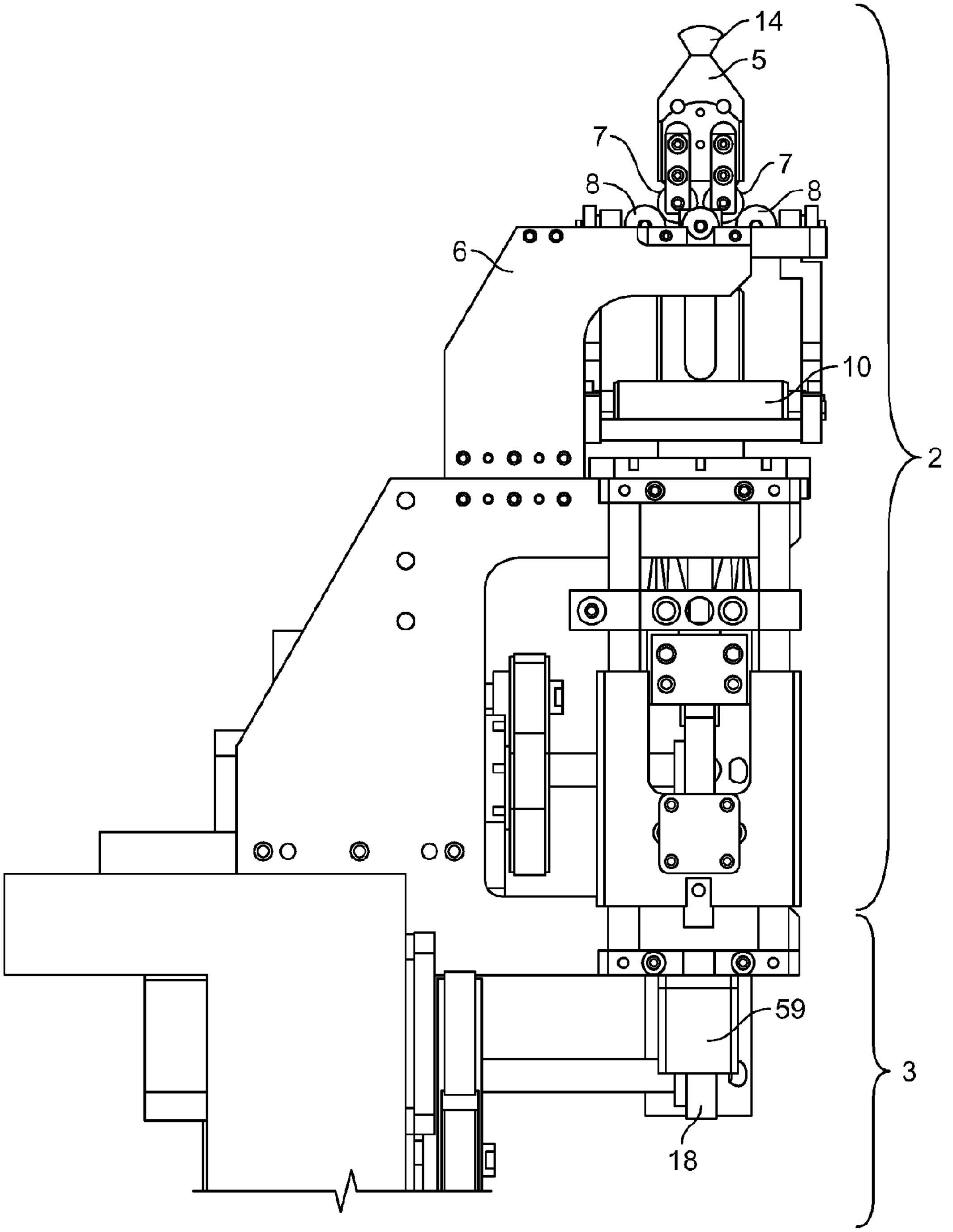
FIG. 24 is an enlarged right side view of the label feeding assembly and the label separating assembly of the stretch film sleeve label applicator as shown in FIG. 3.

In this embodiment, a plurality of cutting blades 21 are pivotally mounted to cutter wheel 19 such that cutting blades 21 pivot inwardly (toward mandrel 5, as shown in FIG. 17) and outwardly (away from mandrel 5, as shown in FIG. 16), between a cutting position and a non-cutting position, respectively, as cutter wheel 19 rotates about mandrel 5. In this embodiment, mandrel 5 includes the same circumferential grove 20 as previously discussed above into which cutting blades 21 extend when cutting blades 21 are in the cutting position. Grove 20 allows cutting blades to pivot inwardly toward mandrel 5 far enough to pass through the sleeve in order cut the sleeve.

In this embodiment, the pivotal movement of cutting blades 21 is controlled by a differential mechanism configured to pivot cutting blades 21 into the cutting position when the sleeve is in the correct position on mandrel 5 and to pivot cutting blades 21 into the non-cutting position after the sleeve is cut.

Preferably, in this embodiment cutter wheel 19 is mounted vertically adjacent to and below an engagement wheel 28 also rotatably mounted about mandrel 5 with mandrel 5 extending through engagement wheel 28 and cutter wheel 19. Engagement wheel 28 includes a plurality of posts 29 that extend through a groove 30 formed in cutter wheel 19 to engage cutting blades 21 and to control the pivoting of cutting blades 21. The pivoting of cutting blades 21 preferably is controlled by a differential mechanism 31 operatively connected to cutter wheel 19 and engagement wheel 28.

Differential mechanism 31 comprises a drive wheel 32 attached to a carrier 33 that holds two opposing pinion gears 34 rotatably mounted thereto. Pinion gears 34 are operably connected to a cutter gear 35 and an engagement gear 36, respectively. Cutter gear 35 and engagement gear 36 are opposingly mounted within carrier 33 transverse to opposing pinion gears 34. Cutter gear 35 is connected to a cutter drive wheel 37 by cutter axle 38 and engagement gear 36 is connected an engagement axle 39 that extends outwardly from carrier 33 and coaxially through drive wheel 32. Cutter drive wheel 37 is operably connected to cutter wheel 19, preferably by a belt drive system.

Drive wheel 32 is operably connected to both a motor 40 and to engagement wheel 28, preferably by a belt drive system, such that motor 40 causes drive wheel 32 and engagement wheel 28 to rotate at the same speed. When drive wheel 32 rotates, carrier 33 also is caused to rotate at the same speed as drive wheel 32. As carrier 33 rotates in speed with drive wheel 32, carrier 33 causes cutter gear 35 and engagement gear 36 to rotate cutter axle 38 and engagement axle 39, respectively. Cutter axle 38 consequently causes cutter drive wheel 37 to rotate at the same speed as drive wheel 32, carrier 33 and engagement axle 39.

Differential mechanism further comprises, in the preferred embodiment, a braking mechanism 41 operably connected to engagement axle 39. Braking mechanism is configured to exert a frictional gripping force on engagement axle 39 in order to slow the speed of engagement axle 39.

When braking mechanism 41 is engaged, the speed of engagement axle 39 is reduced, and such reduced speed is translated to engagement gear 36. When engagement gear 36 slows, pinion gears 34 compensate by causing cutter axle 38 to rotate at a proportionally higher speed. As cutter axle 38 rotates at a higher speed relative to drive wheel 32, cutter drive wheel 37 causes cutter wheel 19 to rotate at a higher speed than engagement wheel 28.

As cutter wheel 19 and engagement wheel 28 rotate at different speeds, posts 29 of engagement wheel 28 travel within groves 30 of cutter wheel 19 and cause cutting blades 21 to pivot inwardly toward mandrel 5 and into the cutting position to cut the sleeve. When braking mechanism 41 is disengaged, cutter wheel 19 and engagement wheel 28 again rotate at the same speed and cutting blades 21 are caused to pivot outwardly away from mandrel 5 and into the non-cutting position, allowing the cut label to be delivered to label stretching assembly 4 and permitting the sleeve to advance downwardly along mandrel 5 in preparation for the next cut.

Those skilled in the art will recognize that the pivotal movement of cutting blades 21 toward and away from mandrel 5 may be accomplished through various means, including by actuators, such as solenoids, operably coupled to each cutting blade. Accordingly, all such alternate means are included within the scope of this disclosure.

In the first and second primary embodiments of applicator 1 of the present invention, label separating assembly 3 preferably further comprises a set of opposing grippers 43 disposed pivotally mounted on opposite sides of mandrel 5 beneath cutter wheel 19.

Grippers 43 are configured to frictionally engage and secure the sleeve against mandrel 5 in order to keep the sleeve stationary while it is being cut by cutter wheel 19. In the preferred embodiment, grippers 43 are controlled by solenoid actuators 44. When the cutting operation is complete, the grippers disengage from the sleeve to permit the separated label to be transported to label stretching assembly 4.

In the third primary embodiment of applicator 1 of the present invention, as shown in FIGS. 3 and 21-24, label feeding assembly 2 and label separating assembly 3 are configured to be used for webs of perforated stretch film sleeve labels. In this embodiment, feed wheels 11 preferably are replaced with a feed belt system and cutter wheel 19 is replaced by a label breaking mechanism.

The feed belt system comprises a pair of upper opposed belt drive wheels 47 and a pair of lower opposed belt drive wheels 48. Upper opposed belt drive wheels 47 are aligned with feed roller bearings 12 of mandrel 5 and lower opposed belt drive wheels 48 are aligned with frame guiding roller bearings 26.

A pair of guide wheels 51 are mounted to frame 6 in order to create paths along which belts 50 may travel. Belts 50 are disposed between feed roller bearings 12 and upper opposed belt drive wheels 47 and between frame guiding roller bearings 26 and lower opposed belt drive wheels 48. A motor 52 is used to drive belts 50, preferably using a belt drive system configured to drive upper opposed belt drive wheels 47, lower opposed belt drive wheels 48 or guide wheels 51.

Between feed roller bearings 12 and frame guiding roller bearings 26, belts 50 travel parallel to mandrel 5 and frictionally engage the sleeve against mandrel 5 for that distance. By frictionally engaging the sleeve against mandrel 5 over an extended area, premature separation of the labels from one another at the perforations is avoided.

The label breaking mechanism comprises a pair of opposing breakers 45 disposed on opposite sides of mandrel 5. Breakers 45 are configured to extend toward mandrel 5 in order to engage the sleeve of stretch film material and to move downwardly along the vertical axis of mandrel 5.

The label breaking mechanism further comprises a vertically displaceable axial portion 46 of mandrel 5. Axial portion 46 is configured to slide up and down along rods (not shown) parallel to the vertical axis of mandrel 5. In the preferred embodiment, axial portion 46 is biased with an internal spring (not shown) that urges axial portion 46 upwardly towards the top of mandrel 5.

Additionally, as shown in FIGS. 9-11, axial portion 46 preferably is formed with a generally castellated design at its lower end configured to matingly engage a receiving castellated design formed in mandrel 5. Such a castellated design helps prevent the sleeve from bunching as it travels along mandrel 5 by allowing air to travel in and out of the space between the sleeve and axial portion 46, thereby minimizing the effect of any vacuum that may be created as the sleeve travels along mandrel 5 at high speed.

It will be appreciated that the castellated design of axial portion 46 may be configured at the lower end of axial portion 46 (as shown in FIGS. 9-11), the upper end of axial portion 46 (not shown) or at both lower and upper ends of axial portion 46 (not shown).

In the preferred embodiment, breakers 45 are aligned with axial portion 46 of mandrel 5 and are configured to frictionally engage the sleeve against axial portion 46 of mandrel 5 at a point just beneath a perforation in the sleeve. Once breakers 45 engage the sleeve, breakers 45 are configured to exert a downward force against the sleeve and axial portion 46.

The downward force applied by breakers 45 causes axial portion 46 to displace vertically along the vertical axis of mandrel 5 with the sleeve frictionally engaged therebetween. The downward force also causes the perforation on the sleeve to break, thereby separating the individual label from the sleeve. Because axial portion 46 moves vertically in speed with breakers 45 as breakers 45 move downwardly along the vertical axis of mandrel 5, the sleeve is kept from bunching or gathering along mandrel 5 during the label separation process.

Once the label has been separated, breakers 45 disengage from the separated label and from axial portion 46. The label is then engaged by intermittent feed wheels 18 for delivery to label stretching assembly 4, as further discussed below, and axial portion 46 returns to its starting position.

In an alternate embodiment of applicator 1 of the present invention, also configured to be used for webs of perforated stretch film sleeve labels, label separating assembly 3 of the third primary embodiment may be modified to replace the label breaking mechanism with a second feed belt system.

Additionally, in this embodiment, the two feed belt systems are interactively coupled to the drive wheel 32 and cutter drive wheel 37 of the differential mechanism of the second primary embodiment of applicator 1 of the present invention. Preferably, drive wheel 32 is interactively coupled with the first (upper) feed belt system and cutter drive wheel 37 is interactively coupled with the second (lower) feed belt system such that the upper feed belt system and the lower feed belt system travel at the same speed.

As the upper feed belt system feeds the sleeve downwardly along mandrel 5, the sleeve is engaged by the lower feed belt system. When braking mechanism 41 is engaged (as discussed above) while the sleeve is engaged by the upper feed belt system and the lower feed belt system, the speed of engagement axle 39 is reduced, and such reduced speed is translated to engagement gear 36. When engagement gear 36 slows, pinion gears 34 compensate by causing cutter axle 38 to rotate at a proportionally higher speed.

As cutter axle 38 rotates at a higher speed relative to drive wheel 32, cutter drive wheel 37 causes the lower feed belt system to travel at a higher speed than the upper feed belt system, thereby exerting a downward force along the longitudinal axis of the sleeve sufficient to separate a label from the sleeve at the perforation. The lower feed belt system continues to travel at a higher speed relative to the upper feed belt system until the separated label is transported by the lower feed belt system off of mandrel 5 on to label stretching assembly 4 and breaking mechanism 41 is disengaged.

When breaking mechanism 41 is disengaged, the upper feed belt system and lower feed belt system again travel at the same speed, and the sleeve continues to travel downward along mandrel 5 in preparation for the separation of the next label.

To transport the separated labels to label stretching assembly 4, in each of the primary embodiments of applicator 1 of the present invention, label separating assembly 3 preferably further comprises a set of opposed intermittent drive wheels 18 disposed on opposite sides of mandrel 5 beneath cutter wheel 19 or the label breaking mechanism, depending on the embodiment.

Intermittent drive wheels 18 are aligned with intermittent drive wheel bearings 16 on mandrel 5 such that intermittent feed wheels 18 intermittently engage intermittent drive wheel bearings 16 in order to frictionally engage and transport the separated label to label stretching assembly 4. Intermittent drive wheels 18 preferably are belt driven by motor 59 and rotate at the same speed.

Intermittent drive wheels 18 are each configured with a flat portion 53 along their respective peripheries. Flat portions 53 of intermittent drive wheels 18 do not frictionally engage the separated label against intermittent drive wheel bearings 16 of mandrel 5, thus preventing any downward force from being exerted upon the label while flat portions 53 are in a generally parallel relationship with mandrel 5. Accordingly, flat portion 53 "skips over" the label so the label remains stationary for that period of time.

The timing of intermittent drive wheels 18 is such that the intermittent drive wheels 18 are disengaged from the label while the label is being separated from the web by cutter wheel 19 or the label breaking mechanism, depending on the embodiment. This permits the label to remain stationary during the separation process, resulting in a clean separation of the label from the web, and permits label stretching assembly 4 to prepare to receive the separated label.

In an alternate configuration of the third primary embodiment of applicator 1 of the present invention, also configured to be used for webs of perforated stretch film sleeve labels, two feed belt systems (upper and lower) are used, as discussed above. However, in this embodiment, the feed belt systems are servo-controlled and the speed of each feed belt system may be variably and independently adjusted. Thus, there is no need for breakers 45 and intermittent drive wheels 18.

Figure 33:
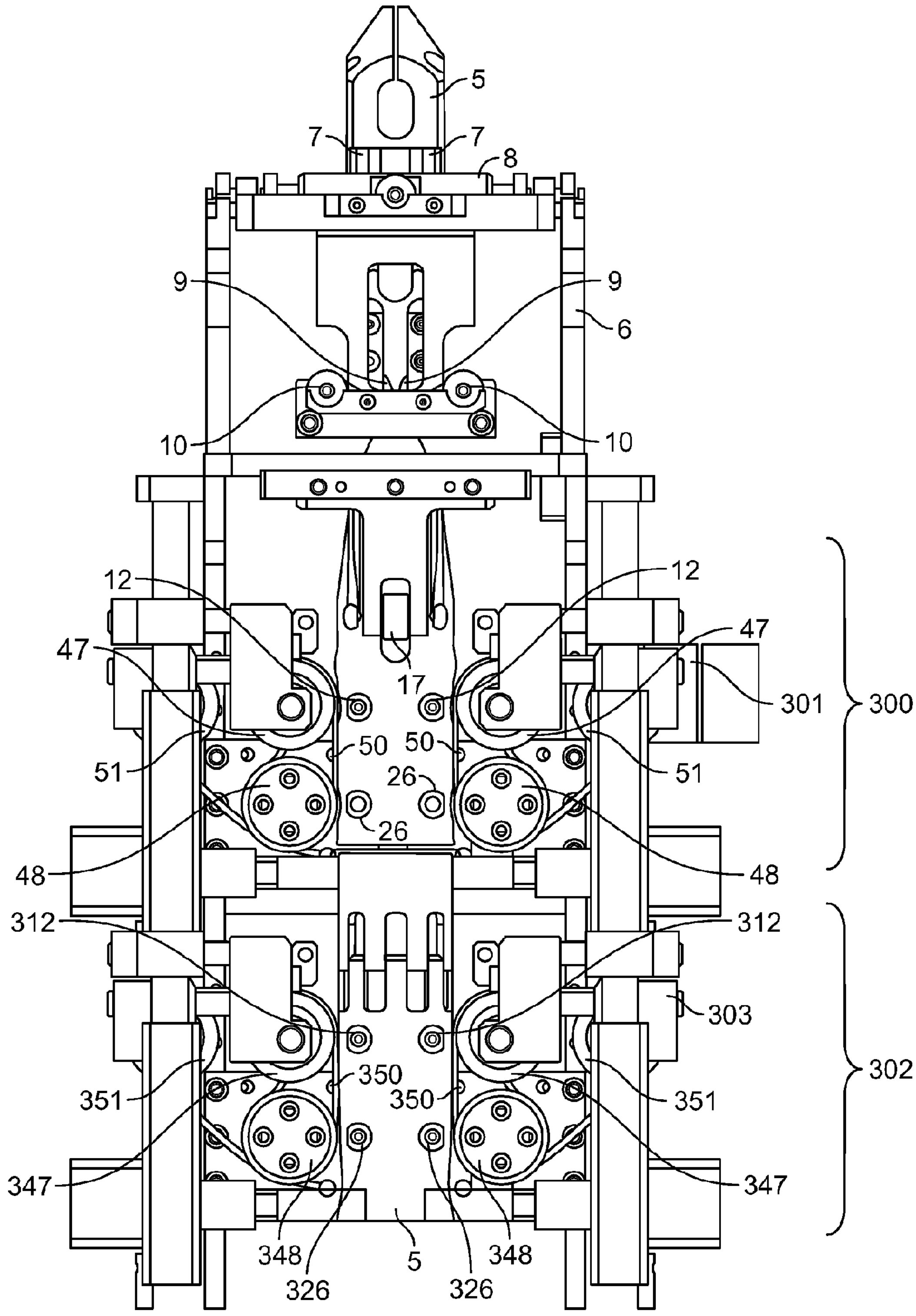
FIG. 33 is an enlarged side view of an alternate embodiment of the label separating assembly of the present invention using multiple drive belt systems to separate the labels.

As shown in FIG. 33, first (upper) feed belt system 300 is similar to the first feed belt system described above and shown in FIG. 22. That is, first (upper) feed belt system 300 comprises a pair of upper opposed belt drive wheels 47 and a pair of lower opposed belt drive wheels 48. Upper opposed belt drive wheels 47 are aligned with feed roller bearings 12 of mandrel 5 and lower opposed belt drive wheels 48 are aligned with frame guiding roller bearings 26.

A pair of guide wheels 51 are mounted to frame 6 in order to create paths along which belts 50 may travel. Belts 50 are disposed between feed roller bearings 12 and upper opposed belt drive wheels 47 and between frame guiding roller bearings 26 and lower opposed belt drive wheels 48. Drive wheels 47 each are interactively coupled to a servo-controlled motor 301 mounted to frame 6 and configured to simultaneously engage drive wheels 47 and rotate drive wheels 47 at identical speeds. The design and operation of servo-controlled motor 301 is well known to those skilled in the art. It will be appreciated that in other embodiments, servo-controlled motor 301 may alternatively drive lower opposed drive wheels 48 or guide wheels 51 instead of drive wheels 47.

Between feed roller bearings 12 and frame guiding roller bearings 26, belts 50 travel parallel to mandrel 5 and frictionally engage the sleeve against mandrel 5 for that distance.

As further shown in FIG. 33, second (lower) feed belt system 302 is similar in design and operation to first (upper) feed belt system 300. That is, second (lower) feed belt system 302 comprises a pair of upper opposed belt drive wheels 347 and a pair of lower opposed belt drive wheels 348. Upper opposed belt drive wheels 347 are aligned with feed roller bearings 312 of mandrel 5 and lower opposed belt drive wheels 348 are aligned with frame guiding roller bearings 326.

A pair of guide wheels 351 are mounted to frame 6 in order to create paths along which belts 350 may travel. Belts 350 are disposed between feed roller bearings 312 and upper opposed belt drive wheels 347 and between frame guiding roller bearings 326 and lower opposed belt drive wheels 348. Drive wheels 347 each are interactively coupled to a servo-controlled motor 303 mounted to frame 6 and configured to simultaneously engage drive wheels 347 and rotate drive wheels 347 at identical speeds. The design and operation of servo-controlled motor 303 is well known to those skilled in the art. It will be appreciated that in other embodiments, servo-controlled motor 303 may alternatively drive lower opposed drive wheels 348 or guide wheels 351 instead of drive wheels 347.

In this manner, the speed of first (upper) feed belt system 300 and second (lower) feed belt system 302 may be independently and variably controlled by servo-controlled motors 301 and 303. Thus, as first (upper) feed belt system 300 feeds the web of sleeves downwardly along mandrel 5, the sleeve is engaged by second (lower) feed belt system 302. At this point, servo-controlled motors 301 and 303 are driving first (upper) feed belt system 300 and second (lower) feed belt system 302 at the same speed.

When it an individual label is to be separated from the web, servo-controlled motor 303 quickly and briefly accelerates and causes the speed of second (lower) feed belt system 302 to quickly and briefly increase. At the same time, the speed of servo-controlled motor 301 is held constant and, therefore, the speed of first (upper) feed belt system 300 remains constant.

The net effect of the brief increase in speed of second (lower) feed belt system 302 while the speed of first (upper) feed belt system 300 remains constant is to exert a downward force along the longitudinal axis of the sleeve sufficient to separate a label from the sleeve at the pre-formed perforation.

Second (lower) feed belt system 302 continues to travel at a higher speed relative to first (upper) feed belt system 300 until the separated label is transported by the second (lower) feed belt system 302 off of mandrel 5 to label stretching assembly 4. After the sleeve is transported to label stretching assembly 4, the speed of second (lower) feed belt system 302 is reduced back to the same speed as first (upper) feed belt system 300, and the sleeve continues to travel downward along mandrel 5 in preparation for the separation of the next label.

In this manner, the instant configuration advantageously eliminates the need for breakers 45 and intermittent drive wheels 18. It will be appreciated however, that, in some embodiments, intermittent drive wheels 18 still may be used in conjunction with second (lower) feed belt system 302 to rapidly transport the separated sleeve to label stretching assembly 4.

As shown in FIGS. 1-3, and 25-29, in each of the primary embodiments of applicator 1 of the present invention, label stretching assembly 4 is configured to receive a separated label, stretch it to fit around a container and release it on to the container.

To that end, label stretching assembly 4 is a generally circular device that comprises a plurality of upstanding fingers 54 that are generally parallel to one another and equally spaced from one another relative to a central longitudinal axis of assembly 4. Fingers 54 move radially toward and away from the central longitudinal axis of assembly 4 (and from each other) into a contracted position (to receive a separated label) and into an expanded position (to stretch and apply the label to a container). In the preferred embodiment, fingers 54 move toward and away from one another by engagement with a rotatable cam plate 63 disposed below fingers 54.

Fingers 54 are mounted to horizontal bases 55 and extend upwardly therefrom. Bases 55 are configured to travel in radial channels 56 formed in a guide plate 57. Bases 55 further comprise posts 157 extending downwardly therefrom configured to engage cam plate 63 disposed beneath guide plate 57 and fingers 54. Cam plate 63 includes a plurality of plurality of arcuate tracks 58 configured to accept posts 157 of fingers 54 and to guide fingers 54 radially toward and away from the central longitudinal axis of assembly 4 as fingers travel in tracks 58 when cam plate 63 rotates. Rotation of cam plate 63 may be accomplished by any suitable means known to those skilled in the art, including use of a pneumatically- or electromechanically-controlled actuator arm (not shown) operably connected thereto.

In the preferred embodiment, each finger 54 is formed with a single integrated internal air channel 60. The upper end of air channel 60 forms top opening 61 disposed in the outer surface of finger 54 and near the top of finger 54. Top opening 61 is recessed from the outer surface of finger 54. The lower end of air channel 60 forms a bottom opening 62 disposed in base 55 of finger 54. In the preferred embodiment, bottom openings 62 of fingers 54 are connected to a source of air pressure and vacuum, such as by appropriate hoses or tubing (not shown) that permits the application of air pressure and vacuum to the outer surface of fingers 54 through air top openings 61.

In one embodiment, each bottom opening 62 of fingers 54 is directly connected to a source of air pressure and vacuum controlled by a shuttle valve that is configured to rapidly switch between pressure and vacuum conditions. Such shuttle valves are well known to those skilled in the art.

Figure 25:
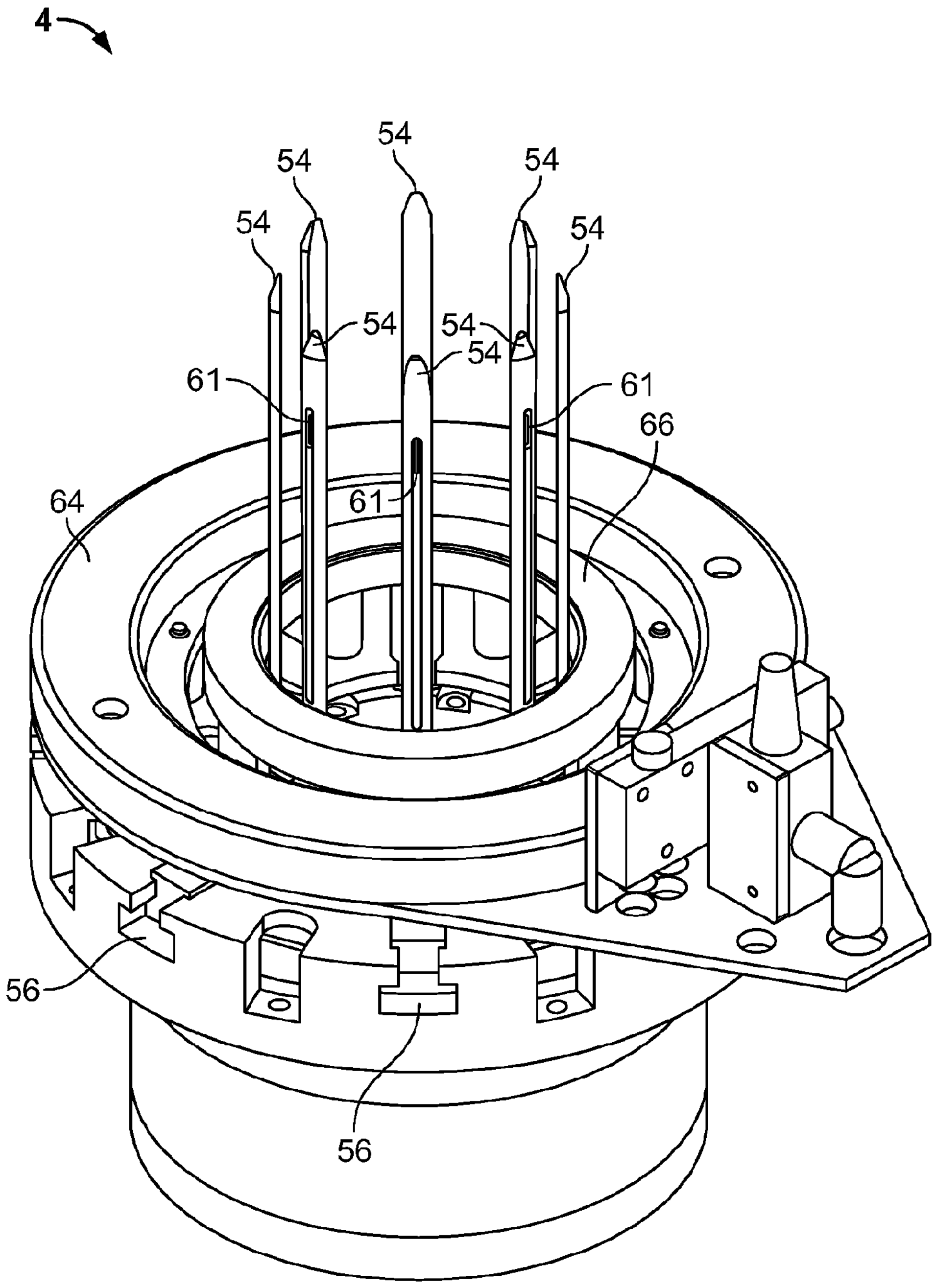
FIG. 25 is an enlarged perspective view of the label stretching assembly in the preferred embodiment of the stretch film sleeve label applicator of the present invention.
Figure 26:
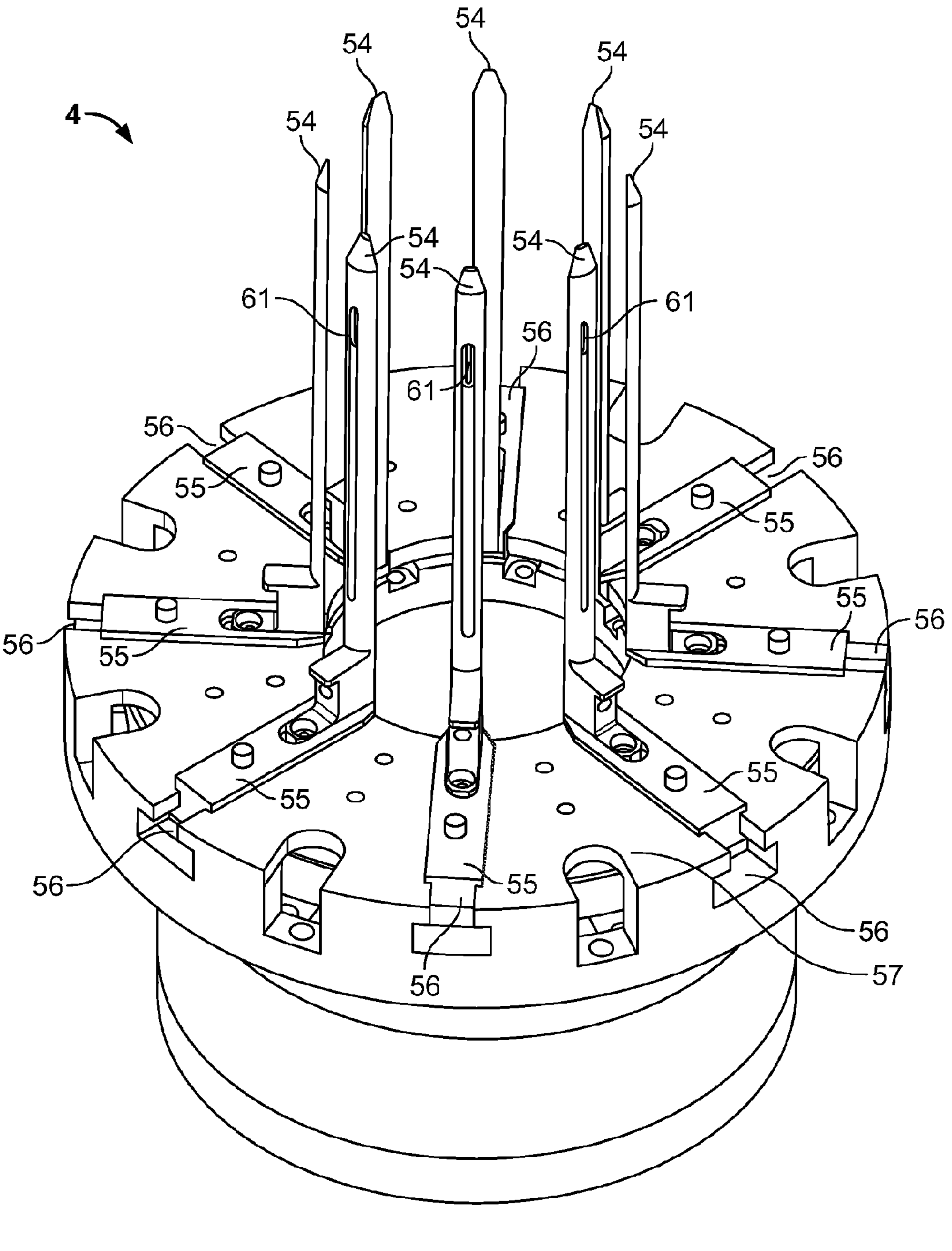
FIG. 26 is an enlarged perspective view of the label stretching assembly in the preferred embodiment of the stretch film sleeve label applicator of the present invention with the air ring removed.
Figure 27:
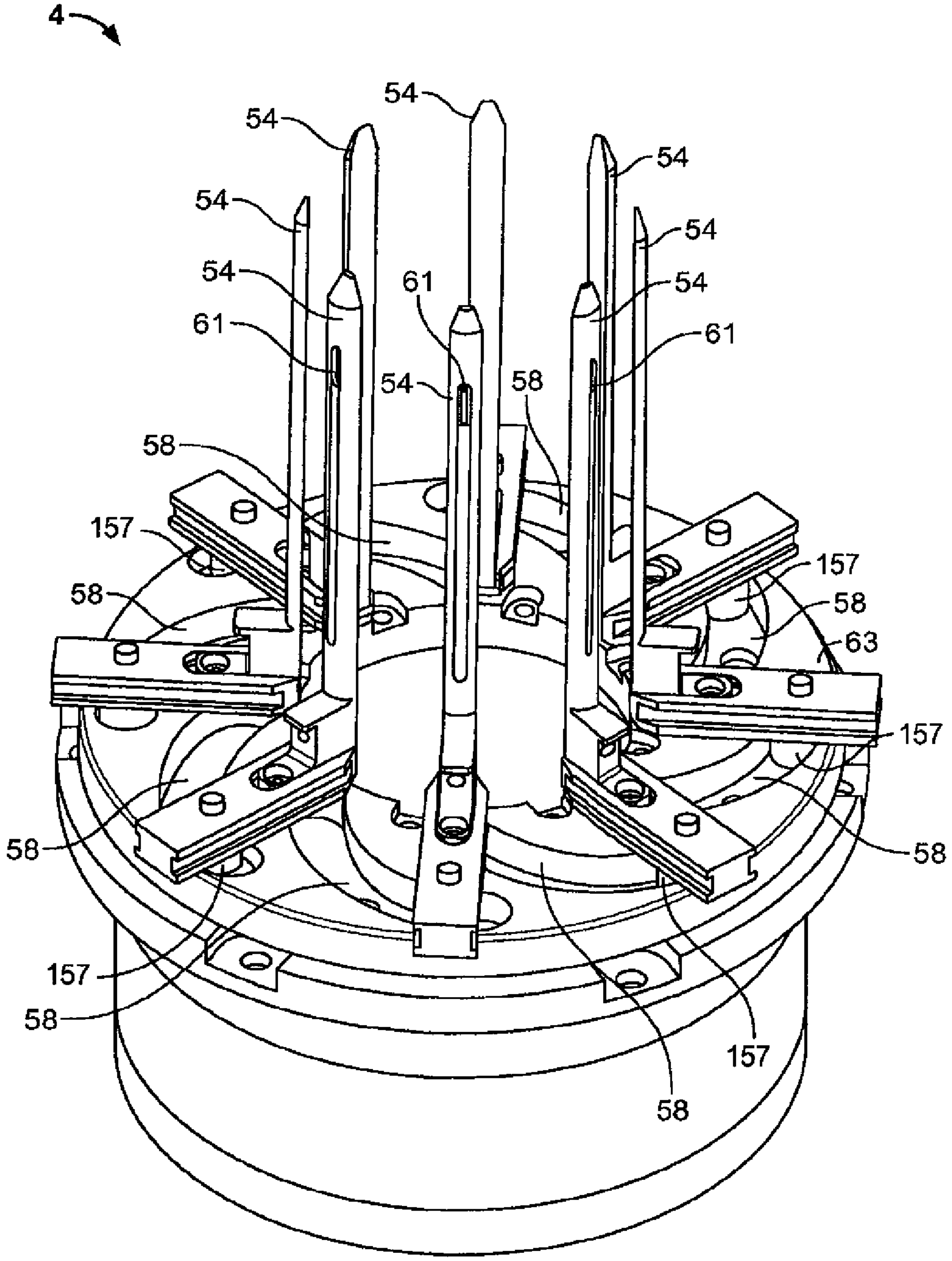
FIG. 27 is an enlarged perspective view of the label stretching assembly in the preferred embodiment of the stretch film sleeve label applicator of the present invention with the cover removed.
Figure 28:
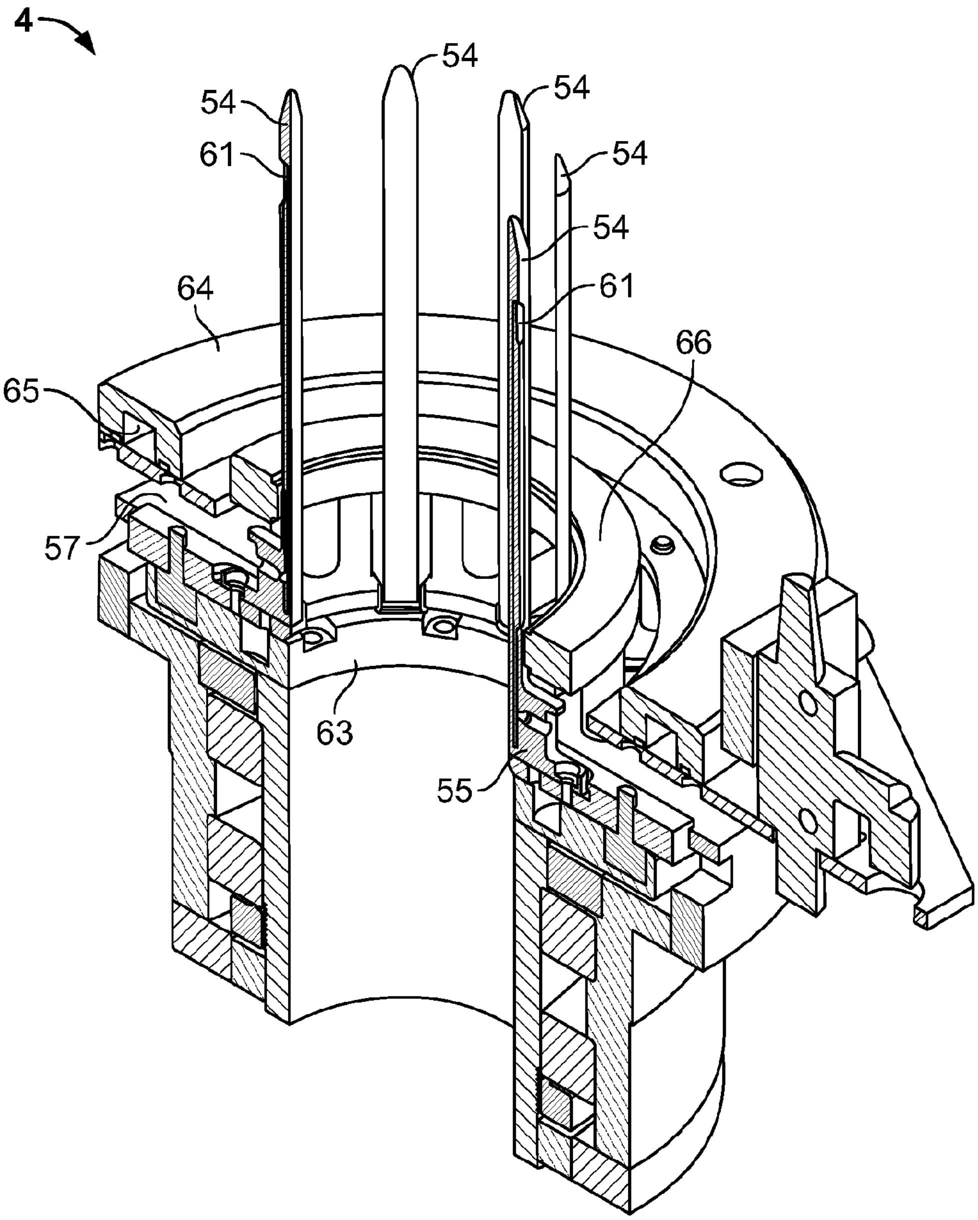
FIG. 28 is an enlarged cross-sectional perspective view of the label stretching assembly in the preferred embodiment of the stretch film sleeve label applicator of the present invention.

In another embodiment, shown in FIGS. 25 and 28, each bottom opening 62 of fingers 54 is connected to an intermediate air ring 64 annularly disposed about fingers 52. Air ring 64 is formed with an integrated channel 65 having a plurality of outlets (not shown) configured to connect with bottom openings 62 of fingers 56 using appropriate hoses or tubing. Air ring 64 further comprises an inlet (not shown) configured to connect to the shuttle valve-controlled source of air pressure and vacuum as previously discussed. Channel 65 is configured to efficiently deliver air pressure and vacuum from the source to fingers 54 using a minimum amount of hosing or tubing.

Figure 34A:
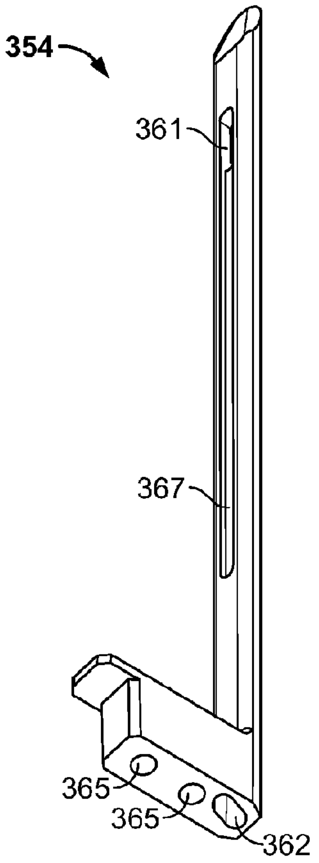
FIG. 34A is an enlarged perspective view of an alternate embodiment of the finger of the label stretching assembly of the present invention.
Figure 34B:
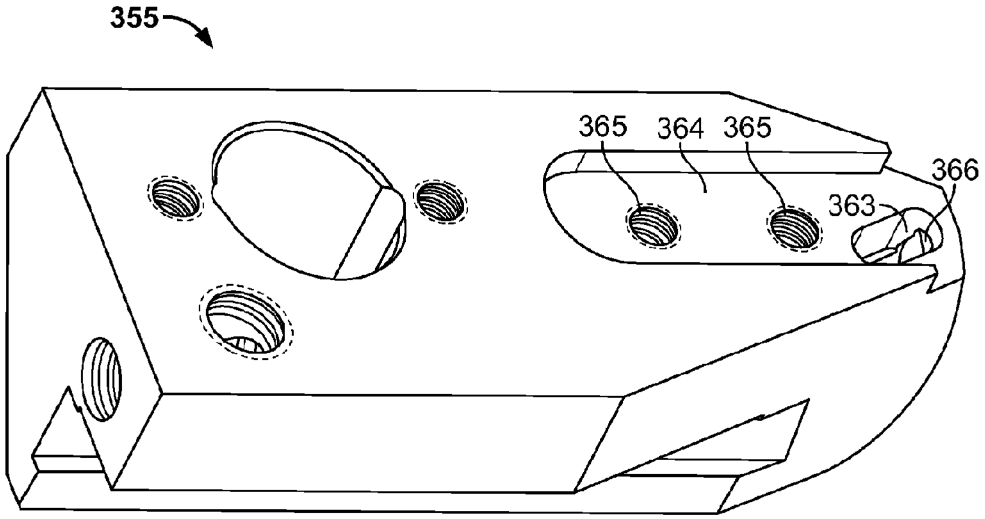
FIG. 34B is an enlarged perspective view of an alternate embodiment of the base for the finger as shown in FIG. 34A; and, FIG. 35 is a fragmentary perspective view of a continuous web of stretch film sleeve labels of the type used in connection with the stretch film sleeve label applicator of the present invention.

Yet another embodiment of finger 354 and base 355 is shown in FIGS. 34A and 34B. In this embodiment, finger 354 is mounted to a base 355 in much the same manner as described above, that is, finger 354 is mounted to horizontal base 355 and extends upwardly therefrom. Finger 354 preferably matinging engages groove 364 formed in base 355 and is secured using screws or bolts (not shown) through openings 365 formed in finger 354 and base 355. A gasket (not shown) preferably is disposed between finger 354 and base 355 to create an airtight seal. Like base 55 in the preferred embodiment, base 355 in the present embodiment is configured to travel in radial channels 56 formed in a guide plate 57 (as shown in FIG. 25-28).

In the present embodiment, finger 354 is formed with a single integrated internal air channel formed within the body of finger 354 (in the same manner as air channel 60 is formed in finger 54 in the preferred embodiment). The upper end of the air channel 60 forms top opening 361 disposed in the outer surface of finger 354 and near the top of finger 354. The lower end of the air channel forms a bottom opening 362 disposed in the bottom surface of finger 354. A gland 367 is formed in the outer surface of finger 354 and extends downwardly from top opening 361 along the outer surface of finger 354.

When finger 354 is mounted in base 355, bottom opening 362 of finger 354 aligns with top opening 363 formed in base 355. Top opening 363 of base 355 is formed integral with side opening 366 formed on the outer surface of base 355. Side opening 366 is connected to a source of air pressure and vacuum, such as by appropriate hoses or tubing (not shown), that permits the application of air pressure and vacuum to the outer surface of finger 354 through air top opening 361 and gland 367.

Label stretching assembly 4 is disposed beneath label separating assembly 3 such that the central vertical axis of label assembly 4 aligns with the central vertical axis of mandrel 5. This configuration permits separated labels to be delivered to label stretching assembly 4 by label separating assembly 3 using intermittent drive wheels 18, as discussed above, to direct the label off of mandrel 5 and onto contracted fingers 54 of label stretching assembly 4.

In use, fingers 54 are urged into a contracted position by rotatably actuating cam plate 63. While fingers 54 remain in a contracted position, a separated label is transported by intermittent drive wheels 18 off of mandrel 5 and on to contracted fingers 54.

In some embodiments of the present invention, label stretching assembly 4 may include optical sensors (not shown) to confirm the proper alignment of the separated label on fingers 54. Additionally, if such sensors detect that the separated label did not fully engage fingers 54, label separating assembly 4 may be configured to rapidly and repeatedly move fingers 54 from a contracted position to a slightly expanded position to create a "shaking" effect in order to correctly align the separated label on contracted fingers 54. Once the label is properly aligned on fingers 54, the vacuum source is activated and a vacuum is applied to the labels through top openings 61 of fingers 54 in order to hold the label against the outer surface of fingers 54.

With vacuum applied, fingers 54 are then moved to the expanded position by rotatably actuating cam plate 63, thereby stretching the label about fingers 54. In one embodiment of label stretching assembly 4 of the present invention, as shown in FIGS. 25 and 28, an annular gripping ring 66 is disposed about fingers 54 such that when fingers 54 are in the expanded position, fingers 54 engage ring 66 with the label held frictionally therebetween. Such frictional engagement complements the vacuum engagement of the label and aids in holding the label in place during application of the label to the container.

Figure 29:
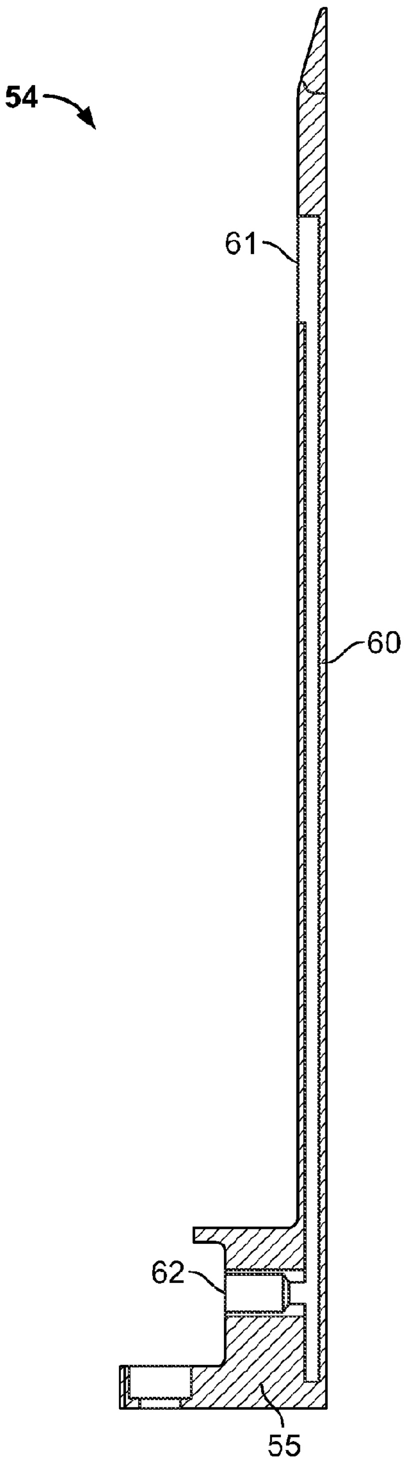
FIG. 29 is an enlarged cross-sectional view of a finger of the label stretching assembly in the preferred embodiment of the stretch film sleeve label applicator of the present invention.
Figure 29A:
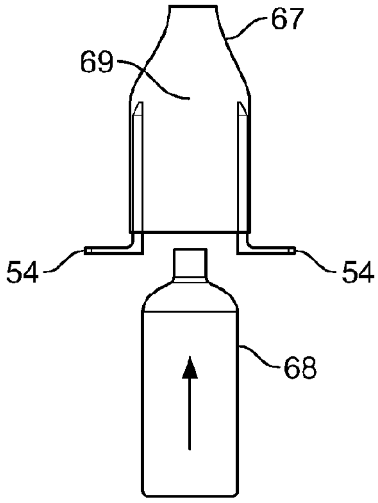
FIG. 29A is a partial front view of the label stretching assembly in the preferred embodiment of the stretch film sleeve label applicator of the present invention with the fingers in an expanding position and a stretched label awaiting application to a container.

As shown in FIG. 29A, while in the expanded position, fingers 54 and the stretched label 67 define an annular configuration with an open central space 69 for receiving the container 68 to be labeled. Central space 69 comprises a generally cylindrical shape having a frusto-conical top. The upper diameter of the frusto-conical top is configured to be sized slightly larger than the diameter of the top of container 68 to be labeled, such as the neck of a bottle. This permits the top of container 68 to pass trough the top of the stretched label 67.

Figure 29B:
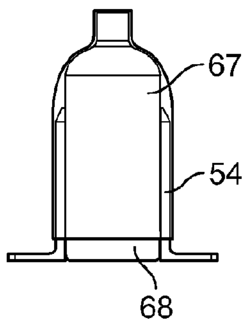
FIG. 29B is a partial front view of the label stretching assembly in the preferred embodiment of the stretch film sleeve label applicator of the present invention with the label partially applied to the container.

Container 68 is then moved upwardly into central space 69 using a container transport mechanism (not shown), such as an elevator arm. As shown in FIG. 29B, when container 68 is properly positioned in central space 69 in relation to stretched label 67, as determined by the distance the container transport mechanism has traveled and/or optical or laser sensors, the vacuum holding the label is reversed by the shuttle switch and positive air pressure is delivered to top openings 61 in fingers 54.

The air pressure forms a cushion of air between fingers 54 and the stretched label 67, thereby reducing the friction between fingers 54 and label 67 and allowing label 67 to frictionally engage container 68, and disengage from fingers 54, as container 68 continues to travel upwardly through central space 69. Once label 67 is fully applied to container 68, container 68 is transported away from the label stretching assembly, such as by means of an extractor mechanism 70, as shown in FIGS. 30-32, and fingers 54 are returned to the contracted position to receive the next label rotatably actuating cam plate 63.

In one embodiment of applicator 1 of the present invention, a plurality of label stretching assemblies 4 may be disposed in series so that, for example, labels can be positioned on fingers 54 of one label stretching assembly 4, while a container is being labeled by another label stretching assembly 4, while fingers 54 of still another label stretching assembly 4 are returning to the contracted position for receipt of another label. It is envisioned that such an arrangement can be carried out using, for example, a turntable, or turret, configuration as shown in FIGS. 30-32.

In such a configuration a rotating turret 70 includes a plurality of label stretching assemblies 4 mounted thereto. Label feeding assembly 2 and label separating assembly 3 are disposed adjacent to turret 70 such that as turret rotates, each label stretching assembly 4 aligns with label separating assembly 3 to receive a separated label.

Figure 30:
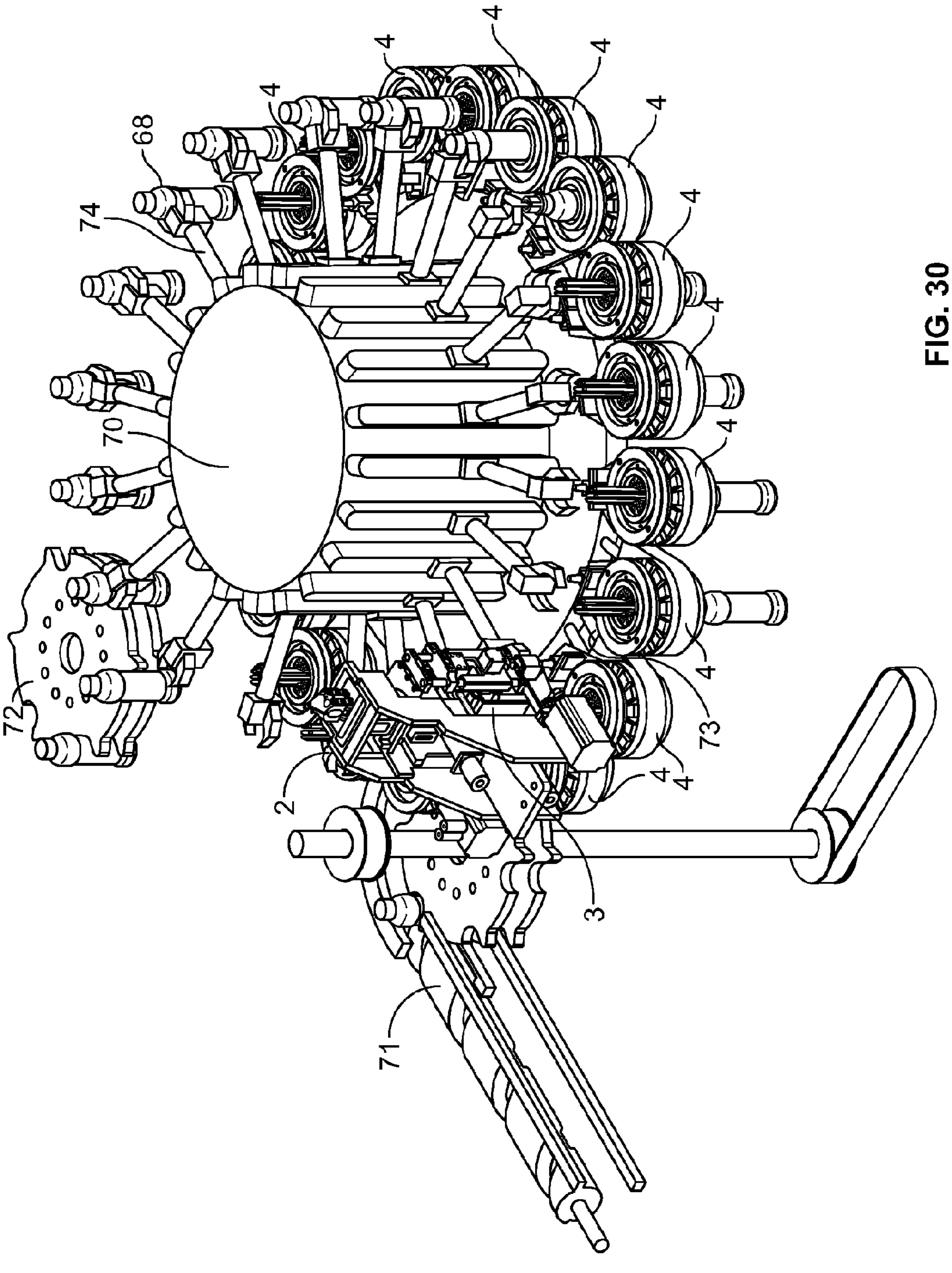
FIG. 30 is a fragmentary perspective view of the an embodiment of the stretch film sleeve label applicator of the present invention having a series of label stretching assemblies mounted on radially extending arms in a turret configuration.
Figure 31:
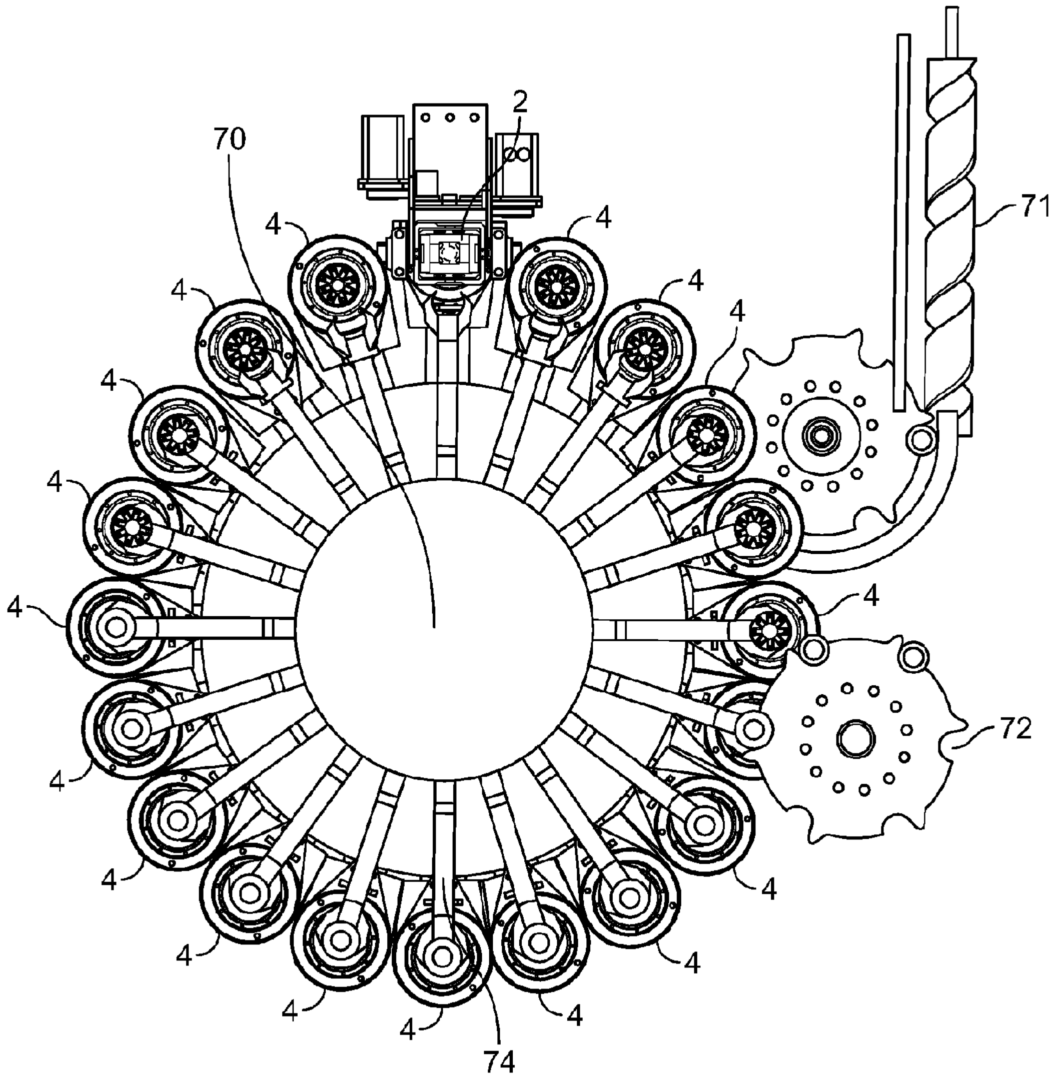
FIG. 31 is a fragmentary plan view of the embodiment of the stretch film sleeve label applicator as shown in FIG. 30.
Figure 32:
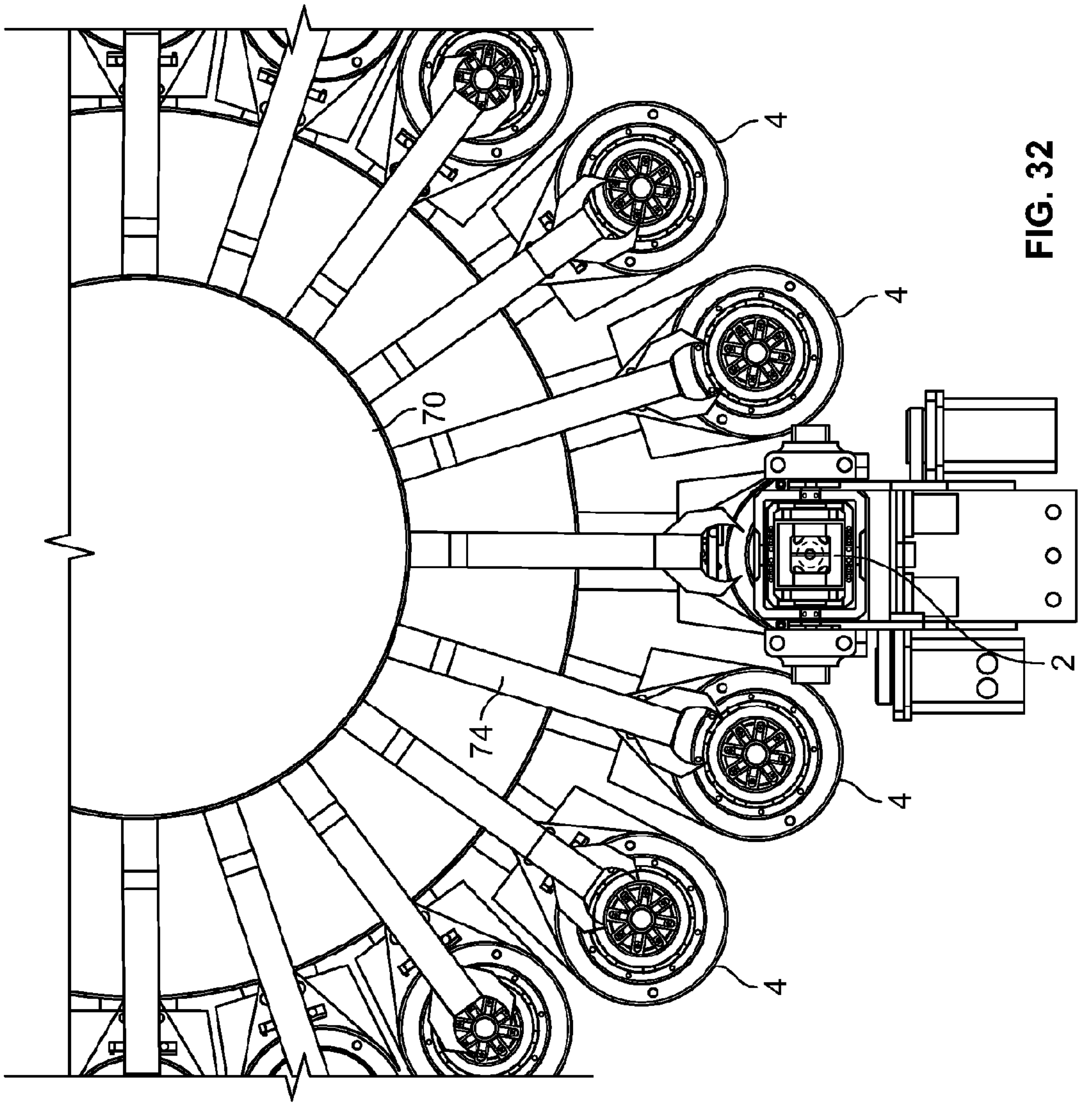
FIG. 32 is an enlarged, fragmentary plan view of the embodiment of the stretch film sleeve label applicator as shown in FIG. 30.

As further shown in FIGS. 30-32, label stretching assemblies 4 may be configured to be radially extendable from turret 70. Such a configuration, particularly useful in situations when space is limited, allows for label feeding assembly 2 and label separating assembly 3 to be radially displaced from the circumference of turret 70 such that a container delivery mechanism 71 and container return mechanism 72 may be placed in close proximity to turret 70. In this embodiment, each label stretching assembly 4 is mounted to extendible arms 73 attached to turret 70.

As a particular label stretching assembly 4 travels on rotating circular turret 70 and approaches label separating assembly 3, arm 73 extends outward from turret 70 to align label stretching assembly 4 with label separating assembly 3 in order to receive a separated label. Then as label stretching assembly 4 continues to travel on rotating turret 70, arm 73 retracts and radially displaces label stretching assembly 4 inwardly such that a container extractor mechanism 74 may deliver the labeled container to a container return mechanism 72. In the preferred embodiment, extractor mechanism 74 is slidably mounted to turret 70 such that extractor mechanism 74 may lift labeled container 68 out of label stretching assembly 4 and deliver it to container return mechanism 72 disposed in a different horizontal plane than label stretching assembly 4.

In another embodiment of the present invention, the plurality of label stretching assemblies 4 on turret 70, described above, may be combined with a plurality of label feeding assemblies 2 and label separating assemblies 3. In this embodiment, the plurality of label feeding assemblies 2 and label separating assemblies 3 are configured in series, mounted on a rotatable "Ferris wheel"-style carriage, with the axis of the carriage normal to the axis of turret 70.

Preferably, the radial movement of label stretching assembly 4 on arm 73 in this embodiment may be controlled by a cam mechanism (not shown). The cam mechanism is configured such that as label stretching assembly 4 travels around turret 70, label stretching assembly 4 follows a straight-line, chordal path, instead of following the circumference of turret 70, within one sector of circular turret 70.

As the label feeding assemblies 2 and label separating assemblies 3 reach the bottom point of the carriage, they are aligned over label stretching assembly 4 as label stretching assembly 4 is traveling along the straight-line, chordal path of turret 70. By delivering a separated label to label stretching assembly 4 while label stretching assembly 4 is traveling in a straight line, the likelihood that the label sufficiently engages label stretching assembly 4 is increased.

It will be appreciated that the applicator of the present invention is adaptable to easily integrate within any number of container filling, labeling and packaging lines as are known in the prior art, such those utilizing various conveyors (such as flat belt and carousel conveyors), screw shafts, elevators and the like to transport containers to and from the applicator.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

What is claimed is:

1. A stretch film sleeve label applicator for separating a stretchable sleeve label from a continuous web of stretchable sleeve labels and applying the label to an item, comprising:

a label feeding assembly;

a label separating assembly; and at least one label stretching assembly, wherein the at least one label stretching assembly comprises a plurality of slender fingers radially arranged and equally spaced from one another relative to a central vertical axis of the label stretching assembly, each finger configured to move between a contracted position to receive the label and an expanded position to stretch the label, such movement occurring along a radius of a circle formed by the plurality of fingers when in the expanded position, the plurality of fingers each having a single opening formed on an outer surface thereof, the opening formed at a top of each of the fingers and configured to alternately provide a vacuum to frictionally engage the label while label is positioned about the item and air pressure to create a cushion of air between the plurality of fingers and the label while the label is applied to the item.

2. The stretch film sleeve label applicator of claim 1 wherein the label feeding assembly comprises a mandrel extending downwardly through the label feeding assembly and the label separating assembly and defining a guide path along which the web travels through the applicator.

3. The stretch film sleeve label applicator of claim 2 wherein the label feeding assembly further comprises at least one pair of opposed feed wheels disposed on opposing sides of the mandrel configured to direct the web downwardly along the mandrel.

4. The stretch film sleeve label applicator of claim 1 wherein the plurality of fingers are configured to move radially toward and away from the central vertical axis of the label stretching assembly, between the contracted position for receiving the label and the expanded position for stretching the label.

5. The stretch film sleeve label applicator of claim 1 wherein the plurality of fingers each comprise an integrated air channel disposed between the top opening formed on the outer surface of each finger and a bottom opening formed in a base of each finger, the bottom opening configured to receive a source of air pressure and vacuum and the air channel configured to deliver the air pressure and vacuum to the top opening.

6. The stretch film sleeve label applicator of claim 1 wherein the at least one label stretching assembly further comprises an annular gripping ring disposed about the plurality of fingers and configured to frictionally engage the label against the plurality of fingers when the plurality of fingers are in the expanded position.

7. The stretch film sleeve label applicator of claim 1 wherein the at least one label stretching assembly comprises a plurality of label stretching assemblies mounted on a rotatable circular turret.

8. A label stretching assembly for stretching a label, comprising:

a plurality of slender upstanding fingers radially arranged and equally spaced from one another relative to a central vertical axis of the label stretching assembly and configured to move radially toward and away from the central vertical axis of the assembly, between a contracted position for receiving the label and an expanded position for stretching the label, such movement occurring along a radius of a circle formed by the plurality of upstanding fingers when in the expanded position, wherein the plurality of upstanding fingers each comprise an integrated air channel disposed between a top opening formed on an outside surface of each finger and a bottom opening formed in a base of each finger, the bottom opening configured to receive a source of air pressure and vacuum and the air channel configured to deliver the air pressure and vacuum to the top opening.

9. A method for separating a stretchable sleeve label from a continuous web of stretchable sleeve labels and applying the label to an item, the method comprising the steps of:

providing a continuous web of stretchable sleeve labels;

transporting the web to a label separating assembly;

separating an individual label from the web of stretchable sleeve labels;

transporting the label to a label stretching assembly having a plurality of slender upstanding fingers radially arranged and equally spaced from one another relative to a central vertical axis of the label stretching assembly and configured to move radially toward and away from the central vertical axis of the label stretching assembly, between a contracted position for receiving the label and an expanded position for stretching the label, such movement occurring along a radius of a circle formed by the plurality of fingers when in the expanded position, wherein the plurality of upstanding fingers each comprise an integrated air channel disposed between a top opening formed on an outside surface of each finger and a bottom opening formed in a base of each finger, the bottom opening configured to receive a source of air pressure and vacuum and the air channel configured to deliver the air pressure and vacuum to the top opening;

applying the label in an annular fashion to the plurality of upstanding fingers while the plurality of upstanding fingers is in the contracted position;

applying a vacuum to the top openings of each of the plurality of upstanding fingers to frictionally engage the label with the outside surface of each of the plurality of upstanding fingers;

moving the plurality of upstanding fingers from the contracted position to the expanded position to stretch the label and to form a central space therein;

positioning the item within the central space;

applying air pressure to the top openings of each of the plurality of upstanding fingers to form a cushion of air between the plurality of upstanding fingers and the label, thereby reducing the friction between the plurality of upstanding fingers and the label and allowing the label to frictionally engage the item and to disengage from the plurality of upstanding fingers;

transporting the item with the label attached thereto away from the plurality of upstanding fingers.

10. The stretch film sleeve label applicator of claim 2 wherein the label separating assembly further comprises at least one pair of opposed upper drive wheels and at least one pair of lower drive wheels, the opposed upper drive wheels disposed on opposing sides of the mandrel from one another, and the opposed lower drive wheels disposed on opposing sides of the mandrel from one another, the opposed upper drive wheels and the opposed lower drive wheels configured to direct the web downwardly along the mandrel.

11. The stretch film sleeve label applicator of claim 10 wherein the at least one pair of opposed upper drive wheels is driven by a variable speed motor.

12. The stretch film sleeve label applicator of claim 10 wherein the at least one pair of opposed lower drive wheels is driven by a variable speed motor.

* * * * *